United States Patent [19]
Emert et al.

[11] Patent Number: 6,066,603
[45] Date of Patent: May 23, 2000

[54] POLAR MONOMER CONTAINING COPOLYMERS DERIVED FROM OLEFINS USEFUL AS LUBRICANT AND USEFUL AS LUBRICANT AND FUEL OIL ADDITIVIES PROCESS FOR PREPARATION OF SUCH COPOLYMERS AND ADDITIVES AND USE THEREOF

[75] Inventors: Jacob Emert, Brooklyn, N.Y.; Albert Rossi, Warren, N.J.; David E. Gindelberger, Bedminster, N.J.; Jon E. Stanat, Chester, N.J.; James P. Stokes, Katy, Tex.; Jaimes Sher, Houston, Tex.

[73] Assignee: Exxon Chemical Patents Inc., Linden, N.J.

[21] Appl. No.: 08/897,959

[22] Filed: Jul. 21, 1997

Related U.S. Application Data

[63] Continuation-in-part of application No. 08/663,468, Jun. 17, 1996, Pat. No. 5,811,379
[60] Provisional application No. 60/022,744, Jul. 24, 1996.
[51] Int. Cl.$^7$ ............................. C10M 145/10; C10L 1/18
[52] U.S. Cl. ......................... 508/472; 508/507; 508/551; 44/393; 44/403; 44/418; 525/296; 525/300; 525/301; 525/302
[58] Field of Search ............................................. 508/472

[56] References Cited

U.S. PATENT DOCUMENTS

| Re. 26,433 | 8/1968 | Le Suer | 252/33.6 |
|---|---|---|---|
| 3,271,310 | 9/1966 | Le Suer | 252/35 |
| 3,275,554 | 9/1966 | Wagenaar | 252/50 |
| 3,306,908 | 2/1967 | Le Suer | 260/326.3 |
| 3,331,776 | 7/1967 | Krukziener | 252/56 |
| 3,368,972 | 2/1968 | Otto | 252/47.5 |
| 3,381,022 | 4/1968 | Le Suer | 260/404.8 |
| 3,413,347 | 11/1968 | Worrel | 260/570.5 |
| 3,438,757 | 4/1969 | Honnen et al. | 44/58 |
| 3,445,441 | 5/1969 | Rushton | 260/89.5 |
| 3,454,555 | 7/1969 | van der Voort et al. | 260/239 |
| 3,522,179 | 7/1970 | Le Suer | 252/51.5 |
| 3,542,680 | 11/1970 | Le Suer | 252/57 |
| 3,565,804 | 2/1971 | Honnen et al. | 252/50 |
| 3,600,372 | 8/1971 | Udelhofen | 260/132 |
| 3,649,229 | 3/1972 | Otto | 44/73 |

(List continued on next page.)

FOREIGN PATENT DOCUMENTS

| 0 279 586 | 8/1988 | European Pat. Off. . | |
|---|---|---|---|
| 0 321 624 A1 | 6/1989 | European Pat. Off. | C08F 8/32 |
| 0 426 637 A2 | 5/1991 | European Pat. Off. . | |
| 0 427 697 A2 | 5/1991 | European Pat. Off. . | |
| 0 454 231 A2 | 10/1991 | European Pat. Off. . | |
| 0 495 375 A2 | 7/1992 | European Pat. Off. . | |
| 0 520 732 A1 | 12/1992 | European Pat. Off. . | |
| 0 561 476 A1 | 9/1993 | European Pat. Off. . | |
| 0 573 403 A2 | 12/1993 | European Pat. Off. . | |
| 0 594 218 A1 | 4/1994 | European Pat. Off. . | |
| 40 30 399 A1 | 4/1992 | Germany | C08F 10/06 |
| WO 91/09882 | 7/1991 | WIPO . | |
| WO 92/00333 | 1/1992 | WIPO . | |
| WO 93/14132 | 7/1993 | WIPO . | |
| WO 93/24539 | 12/1993 | WIPO . | |
| WO 94/03506 | 2/1994 | WIPO . | |
| WO 94/10180 | 5/1994 | WIPO . | |
| WO 94/13709 | 6/1994 | WIPO . | |
| WO 94/13761 | 6/1994 | WIPO . | |
| WO 94/19436 | 9/1994 | WIPO . | |
| WO 95/07941 | 3/1995 | WIPO . | |
| WO95/09877 | 4/1995 | WIPO | C08F 210/02 |
| WO 95/24431 | 9/1995 | WIPO . | |

OTHER PUBLICATIONS

New Pd(II)– and Ni(II)–Based Catalysts for Polymerization of Ethylene and α–Olefins L.K. Johnson et al., J. Am. Chem. Soc., 1995, 117, p. 6414–6415.

Copolymerization of Ethylene and Propylene with Functionalized Vinyl Monomers by Palladium(II) Catalysts L.K. Johnson et al., J. Am. Chem. Soc. 1996, 118, p. 267–268.

Polymers with Main–Chain chirality. Synthesis of Highly Isotacic, Optically Active Poly(4–tert–butylstyrene–alt–CO) Using Pd(II) Catalysts Based on $C_2$–Symmetric Bisoxazoline Ligands M. Brookhart et al., J. Am. Chem. Soc., 1994, 116, p. 3641–3642.

Palladium(II) Catalysts for Living Alternating Copolymerization of Olefins and Carbon Monoxide M. Brookhart, J. Am. Chem. Soc., 1992, 114, p. 5894–5895.

(List continued on next page.)

*Primary Examiner*—Ellen M. McAvoy

[57] ABSTRACT

Polar monomer-containing copolymers derived from at least one α, β unsaturated carbonyl compound, such as alkyl acrylates and one or more olefins, such olefins including ethylene and $C_3$–$C_{20}$ α-olefins such as propylene and 1-butene, which copolymers have (a) an average ethylene sequence length, ESL, of from about 1.0 to less than about 3.0; (b) an average of at least 5 branches per 100 carbon atoms of the copolymer chains comprising the copolymer; (c) at least about 50% of said branches being methyl and/or ethyl branches; (d) substantially all of said incorporated polar monomer is present at the terminal position of said branches; (e) at least about 30% of said copolymer chains terminated with a vinyl or vinylene group; (f) a number average molecular weight, Mn, of from about 300 to about 15,000 when the copolymer is intended for dispersant or wax crystal modifier uses and up to about 500,000 where intended for viscosity modifier uses; and (g) substantial solubility in hydrocarbon and/or synthetic base oil. The copolymers are produced using late-transition-metal catalyst systems and, as an olefin monomer source other than ethylene preferably inexpensive, highly dilute refinery or steam cracker feed streams that have undergone only limited clean-up steps. Fuel and lubricating oil additives, particularly dispersants, wax crystal modifiers and flow improvers, are produced. Where functionalization and derivatization of these copolymers is required for such additives it is facilitated by the olefinic structures available in the copolymer chains.

26 Claims, No Drawings

U.S. PATENT DOCUMENTS

| | | | |
|---|---|---|---|
| 3,649,659 | 3/1972 | Otto et al. | 260/429 R |
| 3,697,428 | 10/1972 | Meinhadt et al. | 252/56 D |
| 3,697,574 | 10/1972 | Plasek et al. | 260/462 R |
| 3,725,277 | 4/1973 | Worel | 252/51.5 R |
| 3,725,480 | 4/1973 | Traise et al. | 260/583 P |
| 3,726,882 | 4/1973 | Traise et al. | 260/296 |
| 3,741,896 | 6/1973 | Abbott et al. | 252/42.7 |
| 3,755,169 | 8/1973 | Adams et al. | 252/35 |
| 3,755,433 | 8/1973 | Miller et al. | 252/51.5 R |
| 3,822,209 | 7/1974 | Knapp et al. | 252/47 |
| 4,273,891 | 6/1981 | Pindar et al. | 525/145 |
| 4,434,270 | 2/1984 | Serres et al. | 524/570 |
| 4,454,059 | 6/1984 | Pindar et al. | 252/51.5 R |
| 4,665,208 | 5/1987 | Welborn, Jr. et al. | 556/179 |
| 4,874,734 | 10/1989 | Kioka et al. | 502/104 |
| 4,908,463 | 3/1990 | Bottelberghe | 556/179 |
| 4,924,018 | 5/1990 | Bottelberghe | 556/179 |
| 4,952,540 | 8/1990 | Kioka et al. | 502/9 |
| 4,968,827 | 11/1990 | Davis | 556/179 |
| 5,017,299 | 5/1991 | Gutierrez et al. | 252/51.5 R |
| 5,041,584 | 8/1991 | Crapo et al. | 556/179 |
| 5,064,802 | 11/1991 | Stevens et al. | 502/155 |
| 5,084,197 | 1/1992 | Galic et al. | 252/52 A |
| 5,091,352 | 2/1992 | Kioka et al. | 502/103 |
| 5,102,566 | 4/1992 | Fetterman, Jr. et al. | 252/32.7 E |
| 5,103,031 | 4/1992 | Smith, Jr. | 556/179 |
| 5,128,806 | 7/1992 | Gutierrez et al. | 252/51.005 A |
| 5,132,380 | 7/1992 | Stevens et al. | 526/126 |
| 5,153,157 | 10/1992 | Hlatky et al. | 502/117 |
| 5,157,137 | 10/1992 | Sangokoya | 556/179 |
| 5,198,401 | 3/1993 | Turner et al. | 502/155 |
| 5,200,103 | 4/1993 | Song et al. | 252/51.5 R |
| 5,204,419 | 4/1993 | Tsutsui et al. | 526/153 |
| 5,206,199 | 4/1993 | Kioka et al. | 502/117 |
| 5,235,081 | 8/1993 | Sangokoya | 556/179 |
| 5,241,025 | 8/1993 | Hlatky et al. | 526/129 |
| 5,248,801 | 9/1993 | Sangokoya | 556/179 |
| 5,278,119 | 1/1994 | Turner et al. | 502/155 |
| 5,321,106 | 6/1994 | LaPointe | 526/126 |
| 5,329,032 | 7/1994 | Tran et al. | 556/179 |
| 5,347,024 | 9/1994 | Nickias et al. | 556/11 |
| 5,387,568 | 2/1995 | Ewen et al. | 502/104 |
| 5,408,017 | 4/1995 | Turner et al. | 526/134 |
| 5,498,809 | 3/1996 | Emert et al. | 585/13 |
| 5,554,310 | 9/1996 | Rossi et al. | 508/591 |

OTHER PUBLICATIONS

Novel Nickel– and Palladium–complexes with Aminobis(imino)phosphorane Ligands for the Polymerization of Ethylene W. Keim et al., Angew. Chem. Int. Ed. Engl. 20, 1981, pp. 116–117.

Novel Polymerization of α–Olefins with the Catalysts System Nickel/Aminobis(imino)phosphorane V.M. Möhring et al., Angew. Chem. Int. Ed. Engl. 24, 1985, p. 1001–1003.

A New Nickel complex for the Oligomerizaion of Ethylene M. Peuckert et al., Organometallics 1983, 2, 594–597.

The Periodic Table of the Elements—"Advanced Inorganic Chemistry", F. A. Cotton, G. Wilkinson, Fifth Edition, 1988, John Wiley & Sons.

A Review of High Resolution Liqid $^{13}$Carbon Nuclear Magnetic Resonance Characterizations of Ethylene–Based Polymers.

J.C. Randal, Journal of Macromolecular Science—Reviews of Macromolecular Chemistry and Physics, C29, 201–317 (1989).

$^{13}$C NMR in Polymer Quantitative Anlyses J.C. Randall et al., NMR and Macromolecules, Sequence, Dynamic, and Domain Structure, ACS Symposium Series No. 247, 131–151 (American Chemical Society, 1984).

Johnson et al, "Copolymerization of ethylene and propylene wih functionalized vinyl monomers by palladium(II) catalysts" Journal of the American Chemical Society, vol. 118, No. 1, pp. 267–268, Jan. 1996.

POLAR MONOMER CONTAINING COPOLYMERS DERIVED FROM OLEFINS USEFUL AS LUBRICANT AND USEFUL AS LUBRICANT AND FUEL OIL ADDITIVIES PROCESS FOR PREPARATION OF SUCH COPOLYMERS AND ADDITIVES AND USE THEREOF

This application claims benefit of provisional application Ser. No. 60/022,744 filed Jul. 24, 1996, this application is a continuation-in-part of Ser. No. 08/663,468 filed Jun. 17, 1996 now U.S. Pat. No. 5,811,379.

FIELD OF THE INVENTION

The invention relates to copolymers derived from polar monomers such as alkyl acrylates and olefinic monomers such as ethylene, $C_3$–$C_{20}$ α-olefins, and mixtures thereof, which possess a specific combination of chemical and physical properties rendering the copolymers particularly suitable as "polymer (or copolymer) backbones" for the preparation of fuel and lubricating oil additives, particularly dispersants, viscosity modifiers and flow improvers. The invention also relates to improved oil-soluble dispersant additives prepared from the copolymers and useful in fuel and lubricating oil compositions, and to concentrates containing the oil-soluble dispersant additives. Furthermore, the invention relates to a continuous process for the copolymerization of at least one alkyl acrylate and at least one of ethylene, α-olefins and mixtures of ethylene and α-olefins using a late-transition-metal catalyst system, and where an α-olefin monomer is used, using it in the form of a highly diluted α-olefin feed, preferably obtained from a refinery or steam cracker feedstream.

BACKGROUND OF THE INVENTION

Hydrocarbon oil and fuel oil compositions typically include additives to enhance performance. For example, such oils typically comprise a mixture of at least one hydrocarbon base oil and one or more additives, e.g., dispersant, viscosity modifier, wax crystal modifier (e.g., pour point depressant), detergent, antioxidant, etc. additives, where each additive is employed for the purpose of improving the performance and properties of the base oil in its intended application; e.g., as a lubricating oil, heating oil, diesel oil, middle distillate fuel oil, power transmission fluid and so forth.

Dispersants are typically polymeric materials with an oleophilic characteristic providing oil solubility and a polar characteristic providing dispersancy. The number average molecular weight of a polymer "backbone" used as a vehicle for synthesizing a dispersant is generally 10,000 or less.

Viscosity modifiers also are typically polymeric materials that can be used neat or with suitable functionalization and/or derivatization be used as multifunctional viscosity modifiers. When used as viscosity modifiers the polymer or copolymer backbone generally has a number average molecular weight of greater than about 15,000.

Dispersants used in lubricating oils typically are hydrocarbon polymers or copolymers modified to contain nitrogen- and ester-based groups. Polyisobutylene is commonly used in the preparation of dispersants, although other hydrocarbon polymers, such as ethyleneα-olefin copolymers, can be employed as well. It is the primary function of a dispersants to maintain in suspension in the oil those insoluble materials formed by oxidation, etc. during use, thereby preventing sludge flocculation and precipitation. The amount of dispersant employed is dictated by the effectiveness of the particular material in achieving its dispersant function. Dispersants can have additional functions, such as viscosity modifying properties and antioxidancy, depending on their chemical and structural characteristics.

Nitrogen- and ester-based dispersants can be prepared by first functionalizing a long-chain hydrocarbon polymer, e.g., polyisobutylene, and ethylene α-olefin (EAO) copolymers with maleic anhydride to form the corresponding polymer substituted with succinic anhydride groups, and then derivatizing the succinic anhydride-substituted polymer with an amine or an alcohol or the like. Polyisobutylene generally contains residual unsaturation in amounts of about one ethylenic double bond per polymer chain, positioned along the chain, whereas the more recently developed EAO copolymers (based on metallocene catalyst systems) contain a substantial amount of terminal vinylidene unsaturation (see, e.g., WO 94/19436, published Sept. 1, 1994, incorporated herein for the purposes of U.S. patent prosecution.) The ethylenic double bonds serve as sites for functionalization by, for example, the thermal "ene" reaction (i.e., by direct reaction with maleic anhydride or one or more other dicarboxylic acid moieties).

Polyisobutylene (PIB) polymers employed in conventional dispersants are sometimes limited by viscosity effects associated with the polymer as well as limited reactivity. EAO copolymers offer improvements, since these products are primarily terminated with vinylidene type unsaturation, but there are additional efficiencies which can be realized with further improvements in reactivity for functionalization and derivatization; also such copolymers require the use of multiple monomer feed streams to produce a copolymer.

The use of highly diluted, purified refinery monomer feedstreams for ethylene and α-olefin polymerization using a metallocene catalyst system to produce an ethylene α-olefin copolymer has been disclosed in U.S. Ser. No. 992,690 (filed Dec. 17, 1992), incorporated herein for the purposes of U.S. patent prosecution. As a consequence of using a Ziegler-Natta catalyst generally, or a metallocene based catalyst system specifically, there are necessary concerns about the purity of the feedstreams since such catalyst systems are particularly sensitive to moisture as well as nitrogen, sulfur and oxygen compounds which can deactivate the catalyst (see, e.g., WO93/24539, page 13, published Dec. 9, 1993).

Johnson, L. K. et al., in *J. Am Chem Soc.,* 1995, 117, 6414, describe the use of Ni and Pd complexes using various activators (including MAO and alkyl aluminum chloride) for the solution homopolymerzation of ethylene, propylene, and 1-hexene. Polymers varying in molecular weight, branch length and crystallinity are disclosed.

Johnson, L. K. et al., in *J. Am Chem Soc.,* 1996, 118, 267, describe the solution copolymerization of ethylene with acrylate comonomers, including methyl acrylate, tert-butyl acrylate, perfluorinated octyl acrylate, and methyl vinyl ketone and propylene with methyl acrylate and perfluorinated octyl acrylate, using a Pd catalyst. The copolymers are disclosed as random, amorphous, and branched (it is stated that ethylene copolymers have approximately 100 branches/ 1000 C atoms) with functional groups located predominantly at branch ends.

Brookhart, M. S. et al., in published patent application EP 0 454 231 A2 (1991) describe a catalyst for the polymerization of ethylene, α-olefins, diolefins, functionalized olefins, and alkynes. The general description of the catalyst broadly includes Group VIIIb metals (Groups 8, 9, 10); cobalt and nickel are exemplified in solution polymerizations to produce oligomers and polymers of limited molecular weight.

Brookhart, M. et al. in *J. Am. Chem. Soc.,* 1994, 116, 3641 and 1992, 114, 5894 describe the use of Pd(II) catalysts to produce alternating olefin/CO copolymers. (Subsequently, it is noted in *J. Am Chem Soc.,* 1995, 117, 6414 that the complexes used in the 1992 reference only dimerize ethylene.)

Keim, W. et al. in *Angew. Chem., Int. Ed. Engl.,* 1981, 20, 116 describe the use of an aminobis(imino)phosphorane complex of Ni to polymerize ethylene under pressure in a toluene solution. The polymer is said to contain short chain branches.

Möhring, V. M. et al. in *Angew. Chem., Int. Ed. Engl.,* 1985, 24, 1001 describe the use of the catalyst system aminobis(imino)phosphorane complex of Ni to polymerize $C_3$ to $C_{20}$ linear α-olefins and singly branched α-olefins. Olefins containing quaternary carbons, vinylene, or vinylidene groups did polymerize, but copolymers of α-olefins could be obtained. Polymerization of linear α-olefins produced polymers containing methyl branches evenly spaced corresponding to the length of the olefin chain. (A "chain running" mechanism proposed as an explanation for the branched polymer structure is also described by L. K. Johnson in *J. Am Chem Soc.,* 1995, 117, 6414, above.)

Peuckert, M. et al. in *Organometallics,* 1983, 2, 594 describe a Ni catalyst for the oligomerization of ethylene in toluene. The catalysts are said to contain the chelating phosphino-acetate ligand used in SHOP catalysts. The $C_4$ to $C_{24}$ oligomers are >99% linear and >93% α-olefin. An ethyleneihexene cooligomerzation produced product with no detectable branches.

A component described as useful in lubricating oil flow improvers described in U.S. Pat. No. 4,839,074 includes polymers and interpolymers of side chain unsaturated monoesters which are unsaturated esters, generally acrylate or 2-alkylacrylate monoesters represented by a defined formula.

It has been found in the present invention, that further improvements can be achieved in the performance of fuel and lubricant additives, particularly including ashless dispersants and wax crystal modifiers, based on the use of copolymers derived from polar and olefinic monomers; also, significant improvements in the economics of producing and using such additives can be achieved by selective use of late-transition-metal catalysts and polymerization processes which use highly dilute refinery or steam cracker olefin feedstreams to produce a copolymer having a unique combination of properties for subsequent functionalization and derivatization.

SUMMARY OF THE INVENTION

Hydrocarbon copolymers derived from polar and olefinic monomers which are suitable for use as a fuel or lubricant additives, e.g., polar monomers including alkyl acrylates and olefinic monomers including ethylene and α-olefins such as propylene, 1-butene, etc. (such copolymers referred to, for convenience, as "polar-olefin hydrocarbon" copolymers or POH copolymers), characterized by a complex set of properties: (a) an average ethylene sequence length, ESL, of from about 1.0 to less than about 3.0; (b) an average of at least 5 branches per 100 carbon atoms of the copolymer chains comprising said copolymer; (c) at least about 50% of such branches being methyl and/or ethyl branches; (d) at least about 30% of the copolymer chains terminated with a vinyl or vinylene group; (e) a number average molecular weight, Mn of from about 300 to about 10,000 for dispersant uses and from about 15,000 to about 500,000 for viscosity modifier uses; and (f) substantial solubility of the copolymer in hydrocarbon and/or synthetic base oil.

This combination of properties yields POH copolymers of the invention especially suitable for use as polymer/copolymer backbones in the preparation of lubricating and fuel oil additives, particularly dispersant additives, as well as for use as wax crystal modifiers and viscosity modifiers. When used as a dispersant backbone, the limited range of number average molecular weight characterizing the POH copolymers of the present invention ensures that dispersants produced therefrom are substantially soluble in lubricating base oils, and, simultaneously, avoids or reduces handling problems due to high viscosity levels and wax crystal interactions. Furthermore, the defined copolymer properties also result in products which have the desired level of wax interaction for their use as wax crystal modifiers and the solution viscosity/temperature properties for use as viscosity modifiers. Because of the relatively high level of terminal vinyl and vinylene unsaturation in the inventive POH copolymers, the dispersant additives produced therefrom have high active ingredient concentrations, thereby providing enhanced lubricating oil dispersancy, including enhanced sludge and varnish control properties.

The copolymers of the present invention are preferably produced using a process which employs as the monomer(s) highly dilute refinery or steam cracker feedstream(s) based on $C_3$, $C_4$ or $C_5$ sources with or without added ethylene. The process is particularly advantageous in that the monomer feedstream need not be totally free of materials which would otherwise be poisons for Ziegler-Natta or metallocene based catalyst systems.

Furthermore, the copolymers of the present invention and the dispersant additives produced therefrom, will possess enhanced pour point performance in lubricating oil compositions to which they are added, particularly in compositions which also contain conventional lubricating oil flow improvers (LOFl's). This beneficial pour point behavior of the dispersants is believed to be attributable in part to the unique copolymer chain structure achievable with the late-transition-metal catalyst system.

A further aspect of this invention relates to the POH copolymer functionalized with reactive groups, such as by substitution with mono- or dicarboxylic acid materials (i.e., acid, anhydride or acid ester) produced by reacting (e.g., by the "ene" reaction) the POH copolymers of the invention with mono-unsaturated carboxylic reactants. The monocarboxylic acid and the dicarboxylic acid or anhydride substituted POH copolymers are useful per se as additives to lubricating oils, and, in another aspect of this invention, can also be reacted with nucleophilic reagents, such as amines, alcohols, amino alcohols and metal compounds, to form derivative products which are also useful as lubricating oil additives, e.g., as dispersants.

In still another aspect of this invention, lubricating oil additives are produced by functionalizing the POH copolymers of the invention using reactants other than the mono-unsaturated carboxylic reactants described above. Accordingly, the copolymer can be functionalized by reaction with a hydroxy aromatic compound in the presence of a catalytically effective amount of at least one acidic alkylation catalyst. Subsequently, the alkylated hydroxyaromatic compound can be reacted by Mannich Base condensation with an aldehyde and an amine reagent to provide a derivatized copolymer.

Lubricating oil additives within the scope of this invention are also produced by oxidation of the POH copolymer of the invention, such as oxidation with a gas containing oxygen and/or ozone. The copolymer can also be functionalized by hydroformylation and by epoxidation. The POH copolymers can also be functionalized by contacting the copolymers under Koch reaction conditions with carbon monoxide in the presence of an acidic catalyst and a nucleophilic trapping agent such as water or a hydroxy-containing compound or a thiol-containing compound to form carboxyl groups on the copolymer. Functionalization can also be accomplished using "Reppe" reaction chemistry (as described in a copending application, U.S. Ser. No. 663,465, filed Jun. 17, 1996 (Docket No. PT-1266), and incorporated herein by reference for the purposes of U.S. prosecution). Furthermore, the aforesaid functionalized copolymers formed by oxidation, hydroformylation, epoxidation, and Koch reaction can be derivatized by reaction with at least one derivatizing compound to form derivatized copolymers.

DETAILED DESCRIPTION OF THE INVENTION

When used in the disclosure and claims, the terms "polymer" and "copolymer" are used interchangeably unless the terms are otherwise specifically distinguished. The present invention relates to copolymers derived from polar monomers such as alkyl acrylates and olefinic monomers such as ethylene, propylene and 1-butene characterized by a certain combination of chemical and physical properties which makes the copolymers especially suitable for use as the backbone of dispersant additives. More particularly, the polar-olefinic hydrocarbon (POH) copolymers of the invention possess a relatively high degree of terminal vinyl and/or vinylene unsaturation, a number average molecular weight within defined ranges, controlled ethylene sequence length within copolymer chains, and the ability to form mineral and/or synthetic oil solutions. Each of these properties contributes in one or more respects to the utility of the copolymer as a dispersant backbone.

Preparation of the Polar-Olefinic Hydrocarbon Copolymer

Polar-olefinic hydrocarbon ("POH") copolymers of the present invention having a relatively high degree of terminal vinyl and/or vinylene unsaturation, for example, at least about 30% of the copolymer chains, can be prepared by polymerizing at least one olefinic monomer selected from the group consisting of (a) ethylene, (b) one or more α-olefins or (c) mixtures of (a) and (b) and optionally, an additional polyene, in the presence of a late-transition-metal catalyst system described below. The POH copolymer chain structure can be controlled through the selection of the late-transition-metal catalyst system and by controlling the relative proportions of the ethylene and/or other α-olefins. One preferred method for preparing the POH copolymers is described in more detail below; it is based on the use of one or more highly diluted monomer feedstreams originating in a refinery or steam cracker.

The polymerization catalyst useful for this invention can be derived from the late-transition-metal compounds of formula:

LMX$_r$ wherein M is a Group 9, 10, or 11 metal, preferably a d$^6$, d$^8$ or d$^{10}$ metal, most preferably d$^8$ (wherein "Group" refers to the identified group of the Periodic Table of Elements, comprehensively presented in "Advanced Inorganic Chemistry," F. A. Cotton, G. Wilkinson, Fifth Edition, 1988, John Wiley & Sons);

L is a bidentate ligand that stabilizes a square planar geometry and charge balances the oxidation state of MX$_r$;

each X is, independently, a hydride radical, a hydrocarbyl radical, a substituted hydrocarbyl radical, a halocarbyl radical, a substituted halocarbyl radical, and hydrocarbyl- and halocarbyl-substituted organometalloid radicals; or two X's are joined and bound to the metal atom to form a metallacycle ring containing from about 3 to about 20 carbon atoms; or one or more X can be a neutral hydrocarbyl containing donor ligand, e.g., an olefin, diolefin, aryne ligand: and r=0, 1, 2, or 3. When Lewis-acid activators, such as methylalumoxane, aluminum alkyls or alkylaluminum halides, which are capable of donating an X ligand as described above to the transition metal component, are used, one or more X may additionally be independently selected from the group consisting of a halogen, alkoxide, aryloxide, amide, phosphide or other univalent anionic ligand or two such X's joined to form an anionic chelating ligand; or one or more neutral non-hydrocarbyl atom containing donor ligand, e.g., phosphine, amine, nitrile or CO ligand.

In a preferred embodiment of the invention, the bidentate ligand, L, is defined by the following formula:

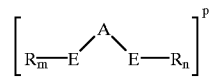

wherein A is a bridging group containing a Group 13–15 element;

each E is independently a Group 15 or 16 element bonded to M;

each R is independently a C$_1$–C$_{30}$ containing radical group which is a hydrocarbyl, substituted-hydrocarbyl, halocarbyl, substituted-halocarbyl, hydrocarbyl-substituted organometalloid, halocarbyl-substituted organometalloid;

m and n are independently 1 or 2, depending on the valency of E; and p is the charge on the bidentate ligand such that the valency of MX$_r$ is satisfied.

In the most preferred embodiment of the invention, the bridging group, A, is defined by the following formulas:

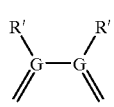

A-1

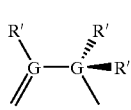

A-2

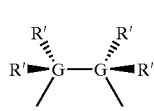

A-3

-continued

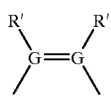 A-4

 A-5

 A-6

 A-7

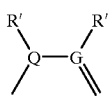 A-8

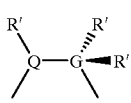 A-9

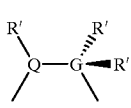 A-10

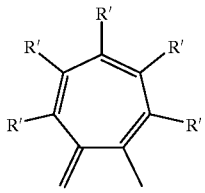 A-11

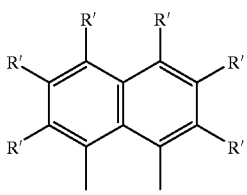 A-12

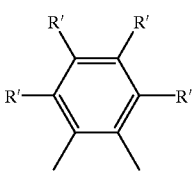 A-13

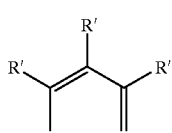 A-14 wherein G is Group 14 element especially C, Si, and Ge;
Q is a Group 13.element especially B, and Al; and
R' are independently hydride radicals, $C_1$–$C_{30}$ hydrocarbyl radicals, substituted hydrocarbyl radicals, halocarbyl radicals, substituted halocarbyl radicals, and hydrocarbyl- and halocarbyl-,substituted organometalloid radicals, and optionally two or more adjacent R' may form one or more $C_4$ to $C_{40}$ ring to give a saturated or unsaturated cyclic or polycyclic ring.

Also in the most preferred embodiment of the invention, R is a bulky $C_1$–$C_{30}$ containing radical group which is a hydrocarbyl, substituted-hydrocarbyl, halocarbyl, substituted-halocarbyl, hydrocarbyl-substituted organometalloid, halocarbyl-substituted organometalloid. Bulky radical groups include phenyls, substituted phenyls, alkyls and substituted alkyls, especially those bonded to E through a tertiary carbon atom, alicyclics and polyaclicyclics containing hydrocarbyls, especially those bonded to E through a tertiary carbon and the like.

In the definitions above, the term "substituted" is as defined or refers to $C_1$–$C_{30}$ containing radicals which are to be essentially hydrocarbyl, but may include one or more non-hydrocarbyl atoms (such as Si, Ge, O, S, N, P, halogen, etc.) in place of one or more carbon atoms.

In the very most preferred embodiment of this invention, M is a group 10 metal, E is a group 15 element, especially nitrogen, with m and n being one and p being zero, the bridge is as drawn in A-1, and R is a substituted phenyl group preferably substituted in at least the 2 and 6 positions with R' groups. The use of Pd is particularly preferred for copolymerization of polar monomers such as α, β unsaturated carbonyl compounds such as alkyl acrylates and methyl vinyl ketone, as defined hereinafter.

Various forms of the catalyst system of the late-transition-metal type may be used in the polymerization process of this invention. Several disclosures in the art which include such catalysts are discussed above and are incorporated herein by reference for the purposes of U.S. prosecution; these publications teach the structure of various late-transition-metal catalysts and include alumoxane as a cocatalyst. There are a variety of methods for preparing alumoxane, one of which is described in U.S. Pat. No. 4,665,208, and it is also available commercially.

For the purposes of this patent specification, the terms "cocatalysts or activators" are used interchangeably and are defined to be any compound or component which can activate a bulky ligand transition metal compound. The late-transition-metal catalyst compounds according to the invention may be activated for polymerization catalysis in any manner sufficient to allow coordination polymerization. This can be achieved, for example, when one X ligand can be abstracted and the other X will either allow insertion of the unsaturated monomers or will be similarly abstractable for replacement with an X that allows insertion of the unsaturated monomer. The traditional activators of metallocene polymerization art are suitable activators; those typically include Lewis acids such as alumoxane compounds, and ionizing, anion pre-cursor compounds that abstract one X so as to ionize the transition metal center into a cation and provide a counterbalancing, compatible, noncoordinating anion.

Alkylalumoxanes and modified alkylalumoxanes are suitable as catalyst activators. The alumoxane component useful as catalyst activator typically is an oligomeric aluminum compound represented by the general formula (R"—Al—O)$_n$, which is a cyclic compound, or R"(R"—Al—O)$_n$AlR"$_2$, which is a linear compound. In the general alumoxane formula R" is independently a $C_1$ to $C_{10}$ alkyl radical, for example, methyl, ethyl, propyl, butyl or pentyl and "n" is an integer from 1 to about 50. R" may also be, independently, halogen, including fluorine, chlorine and iodine, and other non-hydrocarbyl monovalent ligands such as amide, alkoxide and the like, provided that not more than 25% of R" is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane. Methylalumoxane and modified methylalumoxanes are preferred. For further descriptions see, U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 131, EP 0 516 476 A, EP 0 594 218 A1 and WO 94/10180, each being incorporated by reference for purposes of U.S. patent practice.

When the activator is an alumoxane, the preferred transition metal compound to activator molar ratio is from 1:10000 to 10:1, more preferably from about 1:5000 to 10:1, even more preferably from about 1:1000 to 1:1.

The term "noncoordinating anion" as used for the ionizing, anion pre-cursor compounds is recognized to mean an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex between the late-transition-metal catalyst compounds and the ionizing, anion pre-cursor compounds decomposes. Further, the anion will not transfer an anionic substituent or fragment to the cation so as to cause it to form a neutral four coordinate metal compound and a neutral by-product from the anion. Noncoordinating anions useful in accordance with this invention are those which are compatible, stabilize the late-transition-metal cation in the sense of balancing its ionic charge in a +1 state, yet retain sufficient lability to permit displacement by an olefinically unsaturated monomer during polymerization. Additionally, the anions useful in this invention will be large or bulky in the sense of sufficient molecular size to partially inhibit or help to prevent neutralization of the late-transition-metal cation by Lewis bases other than the polymerizable monomers that may be present in the polymerization process.

Descriptions of ionic catalysts, those comprising a transition metal cation (based on metallocenes) and a non-coordinating anion, suitable for coordination polymerization appear in U.S. Pat. Nos. 5,064,802, 5,132,380, 5,198,401, 5,278,119, 5,321,106, 5,347,024, 5,408,017, WO 92100333 and WO 93114132. These references teach a preferred method of preparation wherein metallocenes are protonated by an anion precursor such that an alkyllhydride group is abstracted from a transition metal to make it both cationic and charge-balanced by the non-coordinating anion. These teachings may be useful to those skilled in the art for the late-transition-metal catalysts of the present invention.

The use of ionizing ionic compounds not containing an active proton but capable of producing both the active metal cation and an noncoordinating anion is also known. See, EP-A-0 426 637, EP-A-0 573 403 and U.S. Pat. No. 5,387,568. Reactive cations other than the Brönsted acids include ferrocenium, silver, tropylium, triphenylcarbenium and triethylsilylium, or alkali metal or alkaline earth metal cations such as sodium, magnesium or lithium cations. A further class of noncoordinating anion precursors suitable in accordance with this invention are hydrated salts comprising the alkali metal or alkaline earth metal cations and a non-coordinating anion as described above. The hydrated salts can be prepared by reaction of the metal cation-non-coordinating anion salt with water, for example, by hydrolysis of the commercially available or readily synthesized LiB(pfp)$_4$ which yields [Li.xH$_2$O] [B(pfp)4], where (pfp) is pentafluorophenyl or perfluorophenyl.

Any metal or metalloid capable of forming a coordination complex which is resistant to degradation by water (or other Brönsted or Lewis Acids) may be used or contained in the anion. Suitable metals include, but are not limited to, aluminum, gold, platinum and the like. Suitable metalloids include, but are not limited to, boron, phosphorus, silicon and the like. The description of non-coordinating anions and precursors thereto of the documents of the foregoing paragraphs are incorporated by reference for purposes of U.S. patent practice.

An additional method of making the ionic catalysts uses ionizing anion precursors which are initially neutral Lewis acids but form the cation and anion upon ionizing reaction with the late-transition-metal compounds, for example tris (pentafluorophenyl) boron acts to abstract a hydrocarbyl, hydride or silyl ligand to yield a late-transition-metal cation and stabilizing non-coordinating anion; see EP-A-0 427 697 and EP-A-0 520 732 which are directed to metallocene catalyst systems. Ionic catalysts for coordination polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

When the cation portion of an ionic non-coordinating precursor is a Brönsted acid such as protons or protonated Lewis bases (excluding water), or a reducible Lewis acid such as ferricinium or silver cations, or alkaline metal or alkaline earth metal cations such as those of sodium, magnesium or lithium cations, the transition metal to activator molar ratio may be any ratio, but preferably from about 10:1 to 1:10; more preferably from about 5:1 to 1:5; even more preferably from about 2:1 to 1:2; and most preferably from about 1.2:1 to 1:1.2 with the ratio of about 1:1 being the most preferred.

A further useful method of activating the late-transition-metal catalyst is to employ a Ziegler cocatalyst. Such cocatalysts will typically be organometallic compounds of a metal of Groups 1, 2, 12, or 13 of the Periodic Table selected from the group consisting of aluminum alkyl, aluminum alkyl halide and aluminum halide. These can be represented by the formulas:

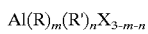

Al(R)$_m$(R')$_n$X$_{3-m-n}$ wherein R' and R are independently hydrocarbyl, including C$_1$ to C$_{10}$ aliphatic, alicyclic or aromatic hydrocarbon radicals which may be the same or different; X is a halogen such as chlorine, bromine or iodine; m and n are integers from 0 to 3 and the sum of (m+n)≦3; and

Al$_2$R$_3$X$_3$ which are hydrocarbylaluminum sesquihalides, such as Al$_2$Et$_3$Cl$_3$ and Al$_2$(iBu)$_3$Cl$_3$; wherein Et is ethyl and iBu is isobutyl.

Examples include triethyl aluminum, diethyl aluminum chloride, Al$_2$Et$_3$Cl$_3$ and Al$_2$(iBu)$_3$Cl$_3$. As is generally recognized in the art, these Ziegler cocatalyst compounds will not effectively activate metallocene catalyst compounds. In a preferred method this activator is reacted with the late-transition-metal catalyst prior to addition of the activated catalyst system to the polymerization reactor.

Further useful late-transition-metal catalysts include those which are known as supported catalysts. Useful catalyst systems of this type are disclosed in the U.S. patent application titled "Supported Late Transition Metal Catalyst Systems" (G. A. Vaughan et al., U.S. Ser. No. 60/020,095, filed Jun. 17, 1996, Docket No. 96B035; incorporated herein by reference for purposes of U.S. prosecution).

When using ionic catalysts of the late-transition-metals comprising cations and non-coordinating anions, the total catalyst system can additionally comprise one or more scavenging compounds. The term "scavenging compounds" is meant to include those compounds effective for removing polar impurities from the reaction environment. Impurities can be inadvertently introduced with any of the polymerization reaction components, particularly with solvent, monomer and catalyst feed, and adversely affect catalyst activity and stability. Impurities can result in decreased, variable or even elimination of catalytic activity, particularly when a late-transition-metal cation-noncoordinating anion pair is the catalyst system. The polar impurities, or catalyst poisons include water, oxygen, metal impurities, etc. While the late-transition-metal catalysts of the present invention can be less sensitive to impurities than those of the prior art, e.g., metallocene catalyst systems, reduction or elimination of poisons is a desirable objective. Preferably steps are taken before provision of such into the reaction vessel, for example by chemical treatment or careful separation techniques after or during the synthesis or preparation of the various components; some minor amounts of scavenging compound can still normally be used in the polymerization process itself.

Typically the scavenging compound will be an organometallic compound such as the Group 13 organometallic compounds of U.S. Pat. Nos. 5,153,157, 5,241,025 and WO-A-91109882, WO-A-94/03506, WO-A-93114132, and that of WO 95/07941. Exemplary compounds include triethyl aluminum, trethyl borane, triisobutyl aluminum, methylalumoxane, isobutyl aluminoxane, and n-octyl aluminum. Those scavenging compounds having bulky or $C_8$–$C_{20}$ linear hydrocarbyl substituents covalently bound to the metal or metalloid center being preferred to minimize adverse interaction with the active catalyst. When alumoxane is used as activator, any excess over the amount of late-transition-metal present will act as scavenger compounds and additional scavenging compounds may not be necessary. The amount of scavenging agent to be used with late-transition-metal cation-non-coordinating anion pairs is minimized during polymerization reactions to that amount effective to enhance activity.

Polymerization Process

Generally, the polymerization process is preferably conducted in a continuous manner by simultaneously feeding a polymerizable polar monomer feedstream, one or more refinery or steam cracker feedstream containing the olefinic monomer(s), or separate streams of reaction diluent (if employed), monomers, catalyst and cocatalyst to a reactor and withdrawing solvent, unreacted monomer and copolymer from the reactor, allowing sufficient residence time to form copolymer of the desired molecular weight, and subsequently separating the copolymer from the reaction mixture. If desired, the monomers can be premixed prior to introducing them into the reactor.

The preferred process for producing the POH copolymer is a continuous process using a highly diluted, refinery or steam cracker monomer feedstream in combination with a late-transition-metal catalyst system. Several advantages result from such a process:

(1) the use of dilute monomer feeds results in a lower concentration gradient at the point of monomer introduction into the reactor and, consequently, less time is required to achieve uniform monomer mixing and less time is available for higher molecular weight species formation at the input port;

(2) the use of dilute feeds enables the process to operate at high conversion rates without the attendant buildup of mass transfer resistance attributable to copolymer formation in pure feed systems;

(3) in a preferred embodiment of the process of the present invention employing a boiling reactor and dilute feed, monomer in the vapor space and in the liquid reaction mixture are in equilibrium, particularly when ethylene is used as a comonomer. This is achievable because of the ease of attaining uniform mixing resulting in a reaction mixture having essentially no mass transfer resistance at the liquid/vapor interface;

(4) still further improvements are possible (where two or more monomers are polymerized by the presence of a high concentration of diluent in the olefin feed, such that the major constituents of the diluent boil at about the same temperature as the α-olefin(s) to be polymerized or, where applicable, copolymerized with, e.g., ethylene. Accordingly, where copolymerization with ethylene is involved, ethylene content in the vapor space is further diluted by the α-olefin feed constituents, a major portion of which is diluent. Thus, evaporative cooling does not depend on recycle of high amounts of ethylene in the vapor, ethylene buildup in the reflux is further minimized, and mass transfer resistance to ethylene mixing is further reduced;

(5) a boiling reactor allows the polymerization reaction to be accomplished in a highly isothermal manner because the heat of reaction is easily removed by boiling unreacted monomer and diluents out of the reaction media at nearly constant temperatures, resulting in a narrower molecular weight distribution POH copolymer;

(6) where a copolymer is produced, uniformity of the copolymer is greatly enhanced without the need for manipulation of the condensed vapor to alter its compositional distribution;

(7) the combined use of dilute feed and high conversion facilitates removal of catalyst (deashing) residue and quenching of the copolymer/catalyst mixture since it is easier to mix the copolymer with deashing and quench media;

(8) use of dilute α-olefin containing feeds and high conversion allows for a significant improvement in the overall economics of the process because such dilute feeds can be readily obtained at very low cost as by-product or waste streams derived from other commercial sources, for example, refinery or steam cracker feed streams containing $C_3$, $C_4$ or $C_5$ olefins.

Copolymers produced in accordance with the process of the present invention are copolymers comprising monomer units derived from at least one olefin such as ethylene and α-olefins. Such monomers are characterized by the presence within their structure of at least one ethylenically unsaturated group of the structure >C=$CH_2$ and are highly reactive at low catalyst concentrations. Late-transition-metal catalyzed polymerizations are particularly adaptable for use with ethylene and α-olefin monomers; other olefinically unsaturated monomers may be less reactive. Therefore, various components in suitable refinery or steam cracker streams such as a Raffinate-2 stream (e.g., components such as 2-butenes, and isobutylene), may have limited reactivity in the presence of a late-transition-metal catalyst system. Such components may be considered diluents in the present process and need not be separated from the polymerizable componentis) of the feedstream. Other constituents which may be undesirable, such as butadiene, are made non-reactive or non-poisonous to the catalyst by pre-saturating the double bonds with hydrogen.

Accordingly, suitable α-olefin monomers include those represented by the structural formula $H_2C=CH^R$ wherein R is straight chain or branched chain alkyl radical comprising 1 to 18 carbon atoms and wherein the copolymer formed therefrom contains a high degree of terminal vinyl and vinylene unsaturation. Preferably $R^1$ in the above formula is alkyl of from 1 to 16 carbon atoms, more preferably alkyl of from 1 to 12 carbon atoms, particularly for use as wax crystal modifiers. Those monomers suitable for preparing copolymers intended for use as dispersant backbones are typically those where $R^1$ in the above formula is alkyl of from 1 to 8 carbon atoms, preferably alkyl of from 1 to 6 carbon atoms. Therefore, useful monomers include ethylene, propylene, butene-1, pentene-1,4methylpentene-1, hexene-1, octene-1, decene-1, dodecene-1, tridecene-1, tetradecene-1, pentadecene-1, hexadecene-1, heptadecene-1, octadecene-1, nonadecene-1 and mixtures thereof (e.g., mixtures of ethylene and butene-1, ethylene and propylene, propylene and butene-1, octene-1 and tetradecene-1 and the like).

After polymerization and, optionally, deactivation of the catalyst (e.g., by conventional techniques such as contacting the polymerization reaction medium with an excess of water or an alcohol, such as methanol, propanol, isopropanol, etc., or cooling or flashing the medium to terminate the polymerization reaction), the product copolymer can be recovered by processes; well known in the art. Any excess reactants may be flashed off from the copolymer.

The polymerizable polar monomer useful in the present invention is an α, β unsaturated carbonyl compound selected from the group represented by the formula:

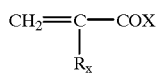

wherein X is hydrogen (H), $NH_2$, $R_y$ or $OR_y$; $R_x$ is H or a $C_1$–$C_5$ straight or branched alkyl group and $R_y$ is H or a $C_1$ to $C_{20}$ straight or branched alkyl group; for short chain unsaturated ester monomers, $R_y$ is preferably a $C_1$–$C_5$ alkyl group and for long chain monomers, preferably a $C_{10}$ to $C_{18}$ alkyl group. Representative acrylate monomers suitable for use in the present invention include methyl acrylate, methyl methacrylate, ethyl acrylate, propyl methacrylate, propyl ethacrylate, butyl acrylate, tert-butyl acrylate, octyl propacrylate, decyl butacrylate, dodecyl pentacrylate, hexyl methacrylate, octyl ethacrylate, decyl methacrylate, dodecyl methacrylate, tetradecyl methacrylate, hexadecyl methacrylate, octadecyl methacrylate, tridecyl acrylate, tetradecyl methacrylate, pentadecyl acrylate, hexadecyl acrylate and octadecyl acrylate. A preferred aldehyde is acrolein ($CH_2=CHCHO$), a preferred ketone is methyl vinyl ketone ($CH_2=CHCOCH_3$) and a preferred compound wherein X is $NH_2$ is acrylamide ($CH_2=CHCONH_2$).

The minimum number of carbon atoms of the $R^y$ substituent is typically selected to avoid insolubility of the copolymer in the fuel or lubricating oil and the maximum number of carbon atoms is selected to avoid crystallization of the copolymer out of the fuel or lubricating oil at low temperatures.

The concentration of polar moiety in the copolymer resulting from copolymerization of the polar monomer described above can range from about 1 to about 6 per chain, preferably from about 1 to about 2 per chain where such copolymer is used to produce dispersants using polyamines in combination with chain-stopping agents (as described later) in order to avoid the formation of gel or oil insoluble dispersant product. The concentration of polar moiety can preferably range from about 2 to about 6 per chain where the amine used to produce the dispersant is a "1-armed" amine (as described later). Generally the polar moiety can be present in said copolymer used to produce dispersants at an average concentration of from about one polar moiety for each 5,000 Mn segment of polymer backbone, including branches, to about one polar moiety for each 1,000 Mn segment.

The polymerization is preferably conducted employing as the reaction medium, a highly diluted monomer feedstream obtained from a refinery or steam cracker. In such a medium there is present a hydrocarbon inert to the polymerization such as butane, isobutane, pentane, isopentane, hexane, isooctane, decane, toluene, xylene, and the like. Alternatively, the polymerization may be conducted using substantially pure monomers, e.g., ethylene and/or propylene. In a process which uses a refinery or steam cracker feedstream, the feedstream containing the olefinic monomer to be polymerized, e.g., 1-butene, typically contains certain amounts of other $C_4$ hydrocarbons. More particularly, the feedstream can comprise less than 5 weight percent isobutylene, at least 12 weight percent total n-butenes (i.e., 1-butene and 2butene), and less than 1 weight percent butadiene, together with n-butane and isobutane. When used to prepare the POH copolymer, a preferred $C_4$ feed stream comprises spent $C_4$ streams produced as by-product in the manufacture of polyisobutylene, wherein the $C_4$ feedstream (often referred to as Raffinate II) contains less than 5 weight percent isobutylene, 10 to 70 weight percent saturated butanes and 15 to 85 weight percent 1-butene and 2-butene. The saturated butanes function as a diluent or solvent in the reaction mixture. Typically the $C_4$ feedstream is maintained at a sufficient pressure to be in the 4 liquid form both at the reactor inlet and in the reaction mixture itself at the reaction temperature. In addition to the olefinic feedstream component there is required a polar monomer feed component as defined above. The polar monomer can be diluted, used neat and, alternatively, can be fed as a separate feedstream or mixed with the olefin feedstream. The amount of polar monomer fed to the reactor will depend on the efficiency of polar monomer incorporation in the copolymer for the particular catalyst system employed and the level of polar monomer desired in the copolymer. These aspects can be readily determined by one skilled in polymerization art.

The preferred reaction process of the present invention is continuous, employs a dilute feed, and is operated to achieve a high level of monomer conversion. For purposes of this invention "continuous" means that a feed stream containing the olefinic monomer is continuously introduced into the reaction zone and resultant POH copolymer product is continuously withdrawn.

The advantages of employing a highly diluted monomer feed are described above. For the purposes of the present invention, the diluent can be any non-reactive (under the conditions employed) material which preferably is capable of: (i) being liquefied under reaction conditions; (ii) dissolving at least the α-olefin monomer where one is employed; and (iii) dissolving or at least suspending the copolymer product under reaction conditions such that viscosity buildup is sufficiently minimized to the extent that the mass transfer rate of the olefin, and ethylene in particular, needed to homogeneously distribute olefin throughout the reaction zone is at least equal to and preferably is greater than, the reaction rate at which olefin is consumed in the polymerization reaction. Suitable but less preferred diluents include such solvents as alkanes, aromatic hydrocarbons, and non-reactive alkenes. It is contemplated that the non-reactive diluents comprise typically at least 30, preferably at least 40, and most preferably at least 50 weight % of the α-olefin feed stream and the diluent can range typically from 30 to 90 (for example from 35 to 75 weight %) preferably from 40 percent to 80, and most preferably from 50 to 60 weight % of the α-olefin feed stream (where ethylene is used as a comonomer, the recited levels refer to concentrations before admixture with ethylene).

It is a particular advantage of the present invention that the preferred monomer feedstream comprises preferred diluents which are present in various refinery or steam cracker streams containing α-olefin monomer reactants; to be useful such streams must contain at least one α-olefin as the reactive constituent. However, these streams typically will contain non-reactive constituents which have a similar carbon number to the α-olefin. The similarity in carbon number causes the non-reactive constituents to have similar boiling points to the α-olefin. Consequently, the non-reactive constituents will vaporize together with the -olefin and not only dilute the α-olefin in the vapor space, but also, where used, ethylene comonomer. This dilution effect decreases the mass transfer resistance of the reactive monomers in the vapor space, particularly ethylene.

Accordingly, a preferred diluent will contain components comprising typically at least 50, preferably at least 75, and most preferably at least 95 weight %, and typically from 50 to 100, preferably from 75 to 100, and most preferably from 95 to 100 weight % thereof, having a boiling point at the reaction conditions of typically within ±20° C., preferably within ±15° C., and most preferably within ±10° C. of the average boiling point of the α-olefin constituents of the feed. Representative of such refinery or steam cracker streams are those which contain butene-1, propylene or $C_5$ α-olefin. Preferred butene-1 containing streams are referred to herein as Raffinate-2 streams. Such streams typically have isobutylene content significantly lowered in relation to the stream from which they are derived. Raffinate-2 is typically derived from either butane:butene catalytic cracking or refinery streams (BB-streams) or Raffinate-1 which, in turn, is derived from butadiene crude produced by steam cracking plants. The composition of Raffinate-2 can vary widely, depending upon the source, e.g., (weight %):

| Component | Crude Butadiene | Raff-2 From Crude | BB | Raff-2 From BB | Raff-1 |
| --- | --- | --- | --- | --- | --- |
| Butadiene | 43.5 ± 20 | 0–5 | 0.3 ± .15 | 0.4 ± 0.2 | 0.1 ± .05 |
| Isobutylene | 25.2 ± 10 | 0–5 | 12.6 ± 6 | 0.2 ± 0.1 | 44.6 ± 20 |

-continued

| Component | Crude Butadiene | Raff-2 From Crude | BB | Raff-2 From BB | Raff-1 |
| --- | --- | --- | --- | --- | --- |
| Butene-1 | 15.5 ± 8 | 49.5 ± 25 | 13.6 ± 6 | 15.4 ± 7 | 27.4 ± 15 |
| cis-Butene-2 | 2.0 ± 1 | 6.4 ± 3 | 9.0 ± 4 | 10.2 ± 5 | 3.5 ± 1.5 |
| trans Butene-2 | 6.2 ± 3 | 19.6 ± 10 | 13.8 ± 6 | 15.6 ± 7 | 10.9 ± 5 |
| n-Butane | 4.6 ± 2 | 14.7 ± 7 | 10.5 ± 5 | 12.0 ± 6 | 8.1 ± 4 |
| Isobutane | 2.9 ± 1.5 | 9.4 ± 4 | 36.7 ± 15 | 42.1 ± 20 | 5.2 ± 2.5 |
| Other* | 0.1 ± 0.5[a] 4.1 ± 2 | 0.2 ± 0.1 | 0.2 ± 0.1[b] | | 3.5 ± 1.5 |

*Other: (a) includes propane, propene, pentanes, pentenes, water, trace other hydrocarbons.
(b) Raffinate-2 derived from MTBE production (using BB-stream or Raffinate-1) will include traces of MTBE, methanol, di-methyl ether, and tert-butyl alcohol.

Typical commercially available butene-1 concentrations in Raffinate-2 range from about 15 to about 55 weight %. The above butene-1-containing refinery or steam cracker streams are preferred for making POH homopolymer or copolymers containing, e.g., ethylene. The instant invention may also make use of BB streams and Raffinate-1 directly, since isobutylene is almost entirely unreactive in the presence of the late-transition-metal catalyst systems. Hence, depending upon shipping costs, convenience, or whatever other factors may affect the decision-making process, one skilled in the art has the option of either acquiring Raffinate-2 and running it through the process of the instant invention or first acquiring either Raffinate-1 or a BB stream, running it through the process, and then shipping the resultant isobutylene-enriched stream to an MTBE plant or other end use. The use of Raffinate-2 is preferred. The use of crude butadiene streams directly is not desired since it would waste butadiene which is hydrogenated prior to polymerization. While it is preferred, It is not required that refinery or steam cracker streams be used and, in fact, it is contemplated that dilute α-olefin containing streams can be prepared by separately combining pure α-olefin and one or more pure diluents, e.g. pure isobutane, such as those typically found in the above refinery or steam cracker streams. If the latter approach is followed, the level of diluent should be based on the teachings herein in order to achieve the advantages of the process disclosed.

It will also be seen that this invention is useful in the production of several POH copolymers and copolymers and may therefore be used in the processing of other dilute refinery or steam cracker streams, such as dilute propene and pentene streams common in the industry. Dilute refinery or steam cracker propene streams, known in the industry as "$C_3$ streams", and dilute refinery or steam cracker pentene streams, known as "$C_5$ streams", are also derived from steam and catalytic cracking and generally can be represented to comprise the following components (ranges, weight %): For $C_3$ streams: Propylene=55±20; Propane=34 ±15; Ethylene=2±1; Ethane=8±4; and Other=1±5 (Other includes methane, acetylenes, propadiene, trace $C_4$'s and $C_5$'s, and trace polar compounds such as water, carbonyl sulfide, methyl mercaptan, and hydrogen sulfide). For $C_5$ streams composition is more complex than that of $C_3$ and $C_4$ streams:

| Component | Range (wt. %) | Component | Range (wt. %) |
|---|---|---|---|
| 2-methyl-Butene-1 | 9.0 ± 4 | n-Pentane | 5.5 ± 2 |
| 3-methyl-Butene-1 | 1.6 ± 1 | Cyclopentane | 0.6 ± .3 |
| Pentene-1 | 5.1 ± 2 | Cyclopentene | 1.5 ± .75 |
| 2-methyl-Butene-2 | 14.9 ± 7 | Piperylene | 0.9 ± .4 |
| Pentene-2 | 15.4 ± 7 | $C_6$ Olefins | 1.5 ± .75 |
| Isoprene | 0.7 ± .3 | $C_6$ Alkyls | 3.5 ± 1.5 |
| Isopentane | 36.2 ± 15 | $C_7$'s and $C_8$'s | 2.0 ± 1 |
| Others* | 1.6 ± 1 | | |

*Others include benzene and polar compounds.

Pentene-1 and cyclopentene are the most reactive components of a $C_5$ stream in the presence of a late-transition-metal catalyst system and are readily separated from each other by distillation and concentrated.

Whether a constituent, e.g. of the refinery or steam cracker stream, qualifies as a diluent under reaction conditions depends on whether it is non-reactive which in turn depends on the specific catalyst and type of pretreatment to which the feed is subjected. "Non-reactive" when used in conjunction with diluent is meant that less than 5 wt. %, preferably less than 3 wt. %, and most preferably less than 1 wt. % of the constituent present in the feed is incorporated into the copolymer product and the constituent does not totally deactivate the late-transition-metal catalyst system. Typically, any saturated hydrocarbon constituent will qualify as diluent as well as unsaturated constituents such as butene-2 and isobutylene which are highly unreactive in the presence of a late-transition-metal catalyst system. Materials such as butadiene tend to deactivate the catalyst. Hence, it is preferred that they be removed or at least partially saturated by hydrogenation. Once saturated, the butadiene becomes part of the diluent as butane, butene-2, or a polymerizable α-olefin, butene-1.

The process of the invention is controlled to achieve high ethylene and α-olefin conversion. Conversion is directly proportional to monomer concentration, catalyst concentration and residence time. Accordingly, these parameters are controlled to achieve an ethylene conversion of typically at least 70%, preferably at least 80%, and most preferably at least 90% and can range typically from 70% to 100%, preferably from 80% to 100% and most preferably from 90% to 100% (e.g., 90–95%). The α-olefin conversion is controlled to be typically at least 30%, e.g., at least 40%, preferably at least 50%, and most preferably at least 60% and can range typically from 30% to 95%, preferably from 40% to 90% and most preferably from 50% to 90%. Monomer conversion (%) can be determined by either of the following equations:

$$= \frac{\text{wt/hr of monomer incorporated into copolymer}}{\text{wt/hr of monomer in feed}} \times 100; \text{ or}$$

$$= \frac{\text{wt/hr monomer in feed} - \text{wt/hr monomer not reacted}}{\text{wt/hr monomer in feed}} \times 100$$

Where a mixed olefin feed is used, e.g., and α-olefin in combination with ethylene, the particular α-olefin conversion employed depends; in part on the apparent ethylene content sought to be imparted to the copolymer and hence on the ethylene concentration in the mixed feed. For example, at low ethylene content the α-olefin conversion typically will be lower than for high ethylene content feeds. While high conversion can be achieved by any combination of process conditions affecting conversion, it is preferred to maintain a low catalyst concentration and low monomer concentration and attain high conversion with a long residence time. Where ethylene is used as a comonomer, preferably the ethylene conversion is controlled in a manner such that the ratio of the weight % of ethylene in the vapor phase to the weight % of ethylene in the reactant feed stream is typically not greater than 1.2:1, preferably less than 1:1 and most preferably from 0.1:1 to 0.7:1 (e.g., 0.1:1 to 0.5:1). The monomer in the reaction mixture is kept low through the use of the diluent in the feed and operating at high conversions.

The catalyst concentration is typically held just above the poison level due to cost of the catalyst. Preferably the feed is treated to remove most if not all catalyst poisons, but this can vary depending on the sensitivity of the particular catalyst system to the presence of poisons. Minor poison contamination can be accommodated by increasing the catalyst system concentration with the excess used to remove the poison by reaction therewith. Accordingly, while any effective catalyst concentration can be employed, it is contemplated that such effective amounts will be sufficient to achieve a weight ratio of late-transition-metal catalyst system to copolymer product of typically from $1 \times 10^{-6}$:1 to $1 \times 10^{-1}$:1.

The residence time is determined from the following equation:

$$\text{Residence time} = \frac{\text{total true volume of liquid in reactor}}{\text{total volume/time of liquid exiting reactor}}$$

wherein gas bubble volume in the liquid is subtracted from apparent volume of liquid in reactor to obtain true volume. Accordingly, residence times can vary from typically, about 0.1 to about 5 hrs.; preferably from about 0.5 to about 4 hrs.; and more preferably from about 1 to about 3 hrs.

Reaction temperature and pressure are preferably controlled to liquefy the diluent and α-olefin. However, when ethylene is present, the reaction temperature is typically selected to be above the critical temperature of ethylene but below the critical temperature of the α-olefin feed and/or diluent. Accordingly, while any effective temperature can be employed in order to produce the POH copolymer of the desired Mn in an efficient manner, it is contemplated that polymerization will generally be conducted at temperatures of from about 0° C. to about 300° C.; preferably from about 10° C. to about 200 ° C.; for a feed containing butene-1 such effective temperatures will range typically from about 10° C. to about 150° C., preferably from about 15° C. to about 120° C., and most preferably from 25° C. to about 110° C. For the dilute refinery or steam cracker streams of propylene having propane as the major diluent, the critical temperature of propylene and propane are 92.42° C. (198.36° F.) and 96.7° C. (206.06° F.) respectively, so the typical range of reaction temperatures would be 10 to 96, and preferably from 25 to 92° C. The critical temperature of the feed components in the reactor places an upper limit on temperature when using a boiling reactor since the reflux mechanism becomes useless if nearly all or all of the feed flashes into the reactor vessel and there remains no liquid phase to reflux. In less preferred embodiments, the operation above the critical temperature of the major reactor constituents must be compensated for by assisting or eliminating the reflux mechanism altogether and relying on alternative cooling means, such as jacketed reactor cooling or internal reactor cooling coils. Neither of these solutions is as effective nor as efficient as reflux cooling in maintaining homogeneity of temperature throughout the reaction solution. As indicated above, the boiling reactor represents the preferred method for temperature control. Variations on the boiling reactor configuration include internal reflux, e.g. using cooling coils inserted into the vapor space or an external system wherein vapor is removed from the vapor space and introduced to an external reflux apparatus, the vapor condensed and the condensate returned to the reactor and/or feed. Alternative non-reflux temperature control means include pumparound cooling where liquid is removed from the reactor, cooled, and then returned to the reactor. Pumparound cooling offers the added advantage of being able to return cooled liquid to the reactor using high pressure pumps to also provide mixing of reactor contents with high speed jets.

Reactor pressures are typically controlled to maintain the diluent and α-olefin in liquid form at the selected temperature. In boiling reactors the pressure is selected to obtain boiling of the diluent/α-olefin reactor constituents. at the reaction temperature. Accordingly while any effective pressure can be employed it is contemplated that where, e.g., a feedstream containing butene-1 is used, such effective pressures will range typically from about 2.4 to about 39 atm., preferably from about 4.4 to about 28 atm., and most preferably from about 5.6 to about 23.5 atm.

The reaction mixture is preferably vigorously mixed by any suitable means such as impeller, jet pump, or vigorous boiling or combinations thereof. Baffles and strategic placement of feed input can be employed to further facilitate mixing. While conducting the polymerization, there is preferably sufficient mixing in the reactor in order to provide substantial homogeneity and where more than one monomer is used, e.g., ethylene and an α-olefin, sufficient mixing to avoid the production of homopolymer of one or both of the monomers, or a compositionally nonuniform copolymer. More particularly, when two or more monomers are used, it is preferred that the monomers together enter a turbulent zone inside the reactor. This can be accomplished in a stirred reactor, for example, by placing all of the all monomer feed inlets near to each other and near the impeller blade. As described herein, mixing is also facilitated by the use of a dilute pre-mixed feed stream from a refinery or steam cracker. Sufficient mixing in the reactor promotes the random incorporation of each monomer unit in a growing copolymer chain, resulting in copolymers of relatively homogeneous composition (both inter-chain and intra-chain) and relatively short sequences of any one monomer, e.g., ethylene (i.e., low ESL values), compared to analogous copolymers produced without such mixing. Analogously, sufficient mixing provides an opportunity to randomize the structure of the POH copolymer even where a single olefinic monomer is used by facilitating mass and heat transfer involving both the catalyst components and the monomers. Effective mixing is especially important to the production of copolymers of the invention having a high concentration of one monomer in a multi-monomer polymerization process (i.e., above 35 weight percent), because, without such mixing, the resulting copolymer could have sufficient monomer sequences to increase the probability of crystallinity, e.g., ethylenic crystallinity in an ethylene copolymer derived from ethylene or another α-olefin, in combination with a polar monomer, e.g., as manifested by ESL values above 2.50.

When carrying out the polymerization in a batch-type fashion, the reaction diluent (if any), and the monomers are charged at appropriate concentration and ratios to a suitable reactor. Care should be taken that all ingredients are dry, with the reactants typically being passed through molecular sieves or other drying means prior to their introduction into the reactor. Although certain of the late-transition-metal catalysts of this invention may be less susceptible to moisture and other poisons than catalysts such as Ziegler-Natta and metallocenes, it is preferred that the catalyst system be of uniform composition and quality in order to reduce variations in the process and the resulting POH copolymer, e.g., its molecular weight and/or MWD. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As copolymer is being formed, additional monomers may be added to the reactor. Upon completion of the reaction, unreacted monomer and solvent are either flashed or distilled off, if necessary by vacuum, and the copolymer of suitable molecular weight withdrawn from the reactor.

Copolymer Characteristics

Employing a late-transition-metal catalyst system in accordance with the procedures and under the conditions as described herein results in a POH copolymer having a high degree of terminal unsaturation, e.g., vinyl and/or vinylene group terminating at least about 30% of the copolymer chains. In contrast, prior art polymers or copolymers produced using a metallocene catalyst system were generally incapable of copolymerizing a significant amount of polar monomer and also resulted in terminally unsaturated olefinic polymers exhibiting a high concentration of vinylidene type unsaturation relative to vinyl type unsaturation, e.g., at least 3.5 to 1; this translates to about 22% vinyl. (see WO 90/1,503) The POH copolymer chains can be represented by the formula POLY—CH=$CH_2$ or POLY—CH =CH—R wherein POLY represents the copolymer chain (including the incorporated polar monomer moiety which is generally present at the terminal position of a branch), —CH=$CH_2$ represents a vinyl group terminating one end of the chain and —CR'=CH—R represents a vinylene group, terminating one end of the chain, wherein R represents an alkyl group such as methyl, ethyl, etc., and R' represents H or an alkyl group such as methyl, ethyl, etc. The POH copolymers typically have vinyl and/or vinylene groups terminating at least about 30 percent of the copolymer chains (although typically, the opposite ends of the same copolymer chain do not each contain an unsaturated structure); preferably, at least about 50 percent, more preferably about 75 percent, still more preferably at least about 80 percent, and most preferably at least about 90 percent of the copolymer chains; typically from about 30 to about 95 percent, preferably from about 50 to about 90 percent, more preferably from about 75 to about 90 percent of the copolymer chains being so terminated. In addition, the copolymers typically have vinylidene groups (i.e., POLY—C(—$CH_2CH_3$)=$CH_2$, where —C($CH_2CH_3$)=$CH_2$ is ethylvinylidene), terminating no more than 15 percent of the chains; e.g., from about 0 to about 15 percent; preferably from about 2 to about 10 percent. Trisubstituted olefinic groups can also be present in minor amounts, for example, no more than 15 percent of the chains; e.g., from about 0 to about 15 percent; preferably from about 0 to about 10 percent. The predominance of vinyl and vinylene terminal olefinic structures differs significantly from the predominantly terminal vinylidene structures resulting from metallocene catalyzed polymerizations of ethylene α-olefin copolymers. The percentage of copolymer chains exhibiting terminal vinyl, vinylene, vinylidene, etc. unsaturation, may be determined by C-13 NMR. It will be understood that a change in the type of late-transition-metal catalyst and/or cocatalyst or activator used to prepare the copolymer can shift the above described double bond distribution to some extent. Because of the relatively high level of terminal vinyl and vinylene unsaturation in the POH copolymers, the dispersant additives produced therefrom have particularly high active ingredient concentrations, thereby providing enhanced lubricating oil dispersancy, which can be exhibited as enhanced sludge and varnish control properties.

The copolymers of this invention, particularly those intended for use in dispersant applications, typically have a number average molecular weight ($M_n$) of from about 300 to about 10,000; preferably from about 700 to about 5,000 (e.g., 1,000–5,000), more preferably from about 700 to about 2,500 (e.g., 1,500 to 2,500) and most preferably from about 750 to about 2,500. When lower molecular weight copolymers are used in wax crystal modifier applications their Mn is up to about 15,000, e.g., from about 500 to about 15,000. Higher molecular weight copolymers of the invention that are oil soluble also find utility in lube oil flow improver and viscosity modifier applications, as well as wax crystal modifiers. For example, useful higher molecular weight copolymers and copolymers have Mn of from about 15,000 to about 500,000; preferably from about 30,000 to about 300,000; more preferably from about 45,000 to about 250,000 e.g., from about 50,000 to about 150,000. Typically, selection of molecular weight in viscosity modifier applications is controlled by shear stability requirements of the contemporary marketplace.

The POH copolymers of this invention preferably exhibit a degree of crystallinity such that they are essentially, and substantially, amorphous.

The nature of the catalyst system employed in this invention can result in a phenomenon referred to as "chain straightening," producing copolymer chains having monomer sequences which appear to have been derived from ethylene monomer (for the sake of convenience, sometimes referred to herein as "apparent" ethylene content), even in those circumstances in which ethylene monomer is not, in fact, employed in the polymerization. Conversely, the use of ethylene monomer alone in the presence of the recited catalyst system results in chain branching, thus giving the appearance of the use of a higher alkyl comonomer, e.g., propylene, even when none is used. (In comparison, the polymerization of ethylene using a Ziegler-Natta or metallocene catalyst system typically results in less than one branch per hundred carbon atoms as a result of "defective" monomer insertion,.) Similarly, in the present invention, polymerization of 1-butene leads to substantial incorporation of linear methylene sequences and a distribution of amorphous chain branches; polymerization of the olefins described leads to branch lengths preferably of from $C_1$–$C_n$, where n is typically 1 to 4.

The α-olefin that is polymerized and the extent and type of branching should be controlled for copolymers intended for use in lubricant and fuel applications. For dispersant and lower molecular weight applications, the olefin is preferably at least one selected from $C_2$–$C_8$ monomers (i.e., ethylene and $C_3$$C_8$ α-olefins); more preferably $C_2$–$C_6$; most preferably $C_1$–$C_4$ olefinic monomers. Very long chain branching should be avoided because dispersancy in, e.g., gasoline engine applications is related to the hydrodynamic volume of the copolymer chain. Incorporating most of the molecular weight of the copolymer into the backbone is preferred; hence typically at least about 50% of the branches should be methyl and/or ethyl ($C_1$ or $C_2$) and at least about 80% of the branches should be $C_1$–$C_4$; preferably at least about 75% should be $C_1$–$C_2$ and 85% should be $C_1$–$C_4$; more preferably at least about 90% should be $C_1$–$C_2$ and 95% should be $C_1$–$C_4$; most preferably at least about 95% of the branches are $C_1$–$C_4$ branches.

The POH copolymers of the present invention provide a uniquely structured backbone for producing the additives of interest. Prior art polymers and copolymers produced using Ziegler-Natta or metallocene catalyst systems typically contained branches whose length was essentially determined by the monomer which was polymerized; e.g., polymerization of propylene resulted in a copolymer containing almost exclusively methyl branches (the exceptions being introduced by incorporation "errors" during polymerization). In contrast, as noted above, the POH copolymers of the present invention contain a distribution of branch lengths which typically result from the polymerization of each monomer or combination of monomers. The distribution of branch lengths results in copolymers whose solution properties, response to temperature and wax interaction/ cocrystallization response differs from the prior art. These characteristics can be tuned in order to achieve a balance not previously available. Generally, catalyst and process features are selected in order to reduce long ethylene sequences in the copolymer backbone and introduce additional branches. This is preferably accomplished by using a Ni-based catalyst and conducting the polymerization at a lower temperature.

Conversely, too little chain branching can lead to insolubility in oil and potential problems with pour point properties. Sufficient chain branching is required so that long, uninterrupted methylene sequences, which are capable of crystallizing at low temperatures and interfering with oil solubility are avoided. Controlled branching and controlled co-crystallization is advantageous in order to modify wax crystal growth in fuel oils so as to optimize such performance in that application. Typically, there should be, on average, at least about 5 branches per 100 carbon atoms, i.e., from about 10 to about 33, for example from about 15 to about 30 branches per 100 carbon atoms of copolymer. In various applications the number of branches is preferably from about 11 to about 25 per 100 carbon atoms; more preferably from about 12 to about 20; most preferably from about 13 to about 16; for example, useful copolymers are produced having from about 10 to about 12.5 branches per 100 carbon atoms present in the copolymer chains. In the present invention additional control means are available at the "copolymer design" level to control the copolymer structure so that it best suits the particular application. For example, in those applications where the extent of branching would be too great using an α-olefin monomer as the only polymerizable olefin, ethylene can be employed as a comonomer. In this manner additional straight chain segments or methylene sequences can be introduced but, since ethylene polymerized using the catalyst system herein also introduces branches, its use would not introduce, e.g., pour point problems.

For the purposes of the present invention in dispersant applications, the POH copolymer will typically contain not greater than 50 weight percent monomer triad sequences which appear to be ethylene-monomer centered, based upon the total copolymer weight; preferably not greater than 45; and most preferably not greater than 40 weight percent of such apparent ethylene monomer sequences based upon the total copolymer weight. Thus, the apparent ethylene content can range typically from 1 to 50 (e.g., from 5 to 50) weight percent, preferably from 5 to 45 (e.g., 5 to 40) weight percent, and most preferably from 10 to 40 (e.g., 10 to 35) weight percent. One can readily calculate the equivalent mole % values for recited ranges based on the particular α-olefin that is used during the polymerization, either alone or in combination with ethylene, for dispersant applications which preferably employs a $C_3$–$C_8$ α-olefin. For example, 50 weight % ethylene in the presence of C3 monomer sequences converts to 60 mole % ethylene, but in the presence of C8 monomer sequences converts to 80 mole %. Similarly, the corresponding values can be calculated for other monomer combinations. For the use of the POH copolymers of the invention as wax crystal modifiers for middle distillate fuels such as diesel fuels and oils such as heating oils, typical ethylene content would be from about 70 to about 90 mole %; preferably from about 74 mole % to about 84 mole %. When used as a viscosity modifier, the copolymer can be produced using ethylene, $C_3$–$C_{20}$ α-olefins and mixtures thereof. Copolymers of suitable molecular weight typically contain from about 50 mole % apparent ethylene derived sequences to about 78 mole percent for a copolymer containing apparent $C_3$ derived sequences and from about 87 mole % to about 96 mole percent ethylene for a $C_{20}$ derived copolymer. (These ranges correspond to 40 to 70 weight %; a more preferred range is from about 45 to about 60 weight percent apparent ethylene sequences.)

The copolymers of this invention may optionally contain small amounts, e.g., typically up to 10, preferably up to 5 weight percent, of units derived from other α-olefins and $C_4$ to $C_{22}$ diolefins. For example, introduction of small amounts of $C_4$ olefins other than butene-1 can result during the preparation of the POH copolymers through the use of 1-butene monomer feed streams which also contain limited amounts of 2-butene, isobutene, and/or butadiene; similarly, limited amounts of polymerizable monomers may be present in refinery or steam cracker-derived $C_3$ and $C_5$ streams.

The POH copolymers of the invention typically also have an average ethylene sequence length (ESL) of from about 1.0 to less than about 3.0; preferably from about 1.0 to about 2.5; more preferably from about 1.0 to about 2.0; for example from about 1.0 to about 1.5. ESL is the ratio of the total number of ethylene units in the copolymer chains to the total number of discrete ethylene sequences in the copolymer chains, as given by the following equation:

$$ESL = (X_{EEE} + X_{REE+EER} + X_{RER})/(X_{RER} + 0.5 \cdot X_{REE+EER})$$

wherein $X_{EEE}$ is the mole fraction of ethylene-ethylene-ethylene triad sequences in the copolymer; $X_{REE+EER}$ is the mole fraction of higher alkyl, R, such as butene, e.g., butene-ethylene-ethylene and ethylene-ethylene-butene triad sequences; and $X_{RER}$ is the mole fraction of the higher alkyl, R, such as butene-ethylene-butene triad sequences. The ethylene sequences can be present as a result of the copolymerization of ethylene with an α-olefin or, as a result of the use of the late-transition-metal catalyst, "chain straightening" which occurs when polymerizing one or more α-olefins, resulting in the presence of a higher alkyl, R, in the copolymer chain. The ESL value is an index reflecting the distribution of the units derived from ethylene or resulting in ethylene sequences (and therefore apparently derived from ethylene) in the POH copolymer chains. As the value for ESL increases for a given POH copolymer of fixed ethylene content (actual or apparent), the number of isolated ethylene units in the chains declines, and, concomitantly, the number of ethylene units per ethylene sequence increases. Naturally, as the ethylene content increases in an POH copolymer containing even a random distribution of ethylene units, the general tendency is to obtain increased ESL values. As per the above equation, the ESL value of a copolymer can be calculated from $X_{EEE}$, $X_{REE+EER}$, and $X_{RER}$, where R is, for example, butene, which values are determined from the copolymer's C-13 NMR spectrum, using the methods described in, for example, Randall, James C., Journal of Macromolecular Science—Reviews of Macromolecular Chemistry and Physics, C29, 201–317 (1989). Alternatively, and as an approximation, one can use the integral of the "polymethylene" peak at 29.9 ppm and compare the value obtained to the total aliphatic or methyl integral.

The POH copolymers of this invention preferably also have a molecular weight distribution (MWD), defined as the ratio of the weight average molecular weight ($M_w$) to the number average molecular weight (i.e., MWD=$M_w/M_n$), of less than about 5, preferably less than about 4, and most preferably less than about 3. More specifically, the copolymers have a molecular weight distribution of from about 1.0 to about 3.5, and most preferably from about 1.1 to about 3. It will be appreciated by one skilled in the art that the MWD of the copolymer is broadened by variations of temperature, monomer concentration, and catalyst concentration and the specific level will be affected by the specific process conditions selected and the specific catalyst system employed. Both $M_n$ and $M_w$ can be determined by the technique of gel permeation chromatography (GPC) with a suitable calibration curve, from which MWD can be readily obtained. $M_n$ and MWD for ethylene-α-olefin copolymers, for example, can be obtained using calibration curves based upon polydisperse ethylene-α-olefin copolymers having ethylene contents similar to that of the samples under test. For a description of the determination of $M_n$ and MWD using GPC (also known as size exclusion chromatography), see W. W. Yau, J. J. Kirkland and D. D. Bly, "Modern Size Exclusion Liquid Chromatography", John Wiley and Sons, New York, 1979. $M_n$ can alternatively be determined for certain copolymers such as ethylene-α-olefin copolymers from either their proton- or carbon-13 NMR spectra obtained in solution, using conventional analytical techniques known to those skilled in the art. See, for example, "C13-NMR in Polymer Quantitative Analyses," J. C. Randall and E. T. Hiseh, in: *NMR and Macromolecules, Sequence, Dynamic, and Domain Structure*, ACS Symposium Series No. 247, 131–151 (American Chemical Society, 1984).

Further Functionalization and Derivatization of the Copolymer

The copolymers produced in accordance with the present invention can be considered to be functionalized as a consequence of the presence of the polar moiety, i.e., having at least one functional group present within its structure, which functional group is capable of: (1) undergoing further chemical reaction (e.g. derivatization) with other material/or (b) imparting desirable properties, not otherwise possessed by an olefinic homopolymer or copolymer alone, absent the presence of a polar moiety. However, the copolymer of the present invention also has olefinic unsaturation present in its structure, preferably in the form of a terminal vinyl group, and such unsaturation is capable of being further modified or further functionalized. Additionally, the functional group can be incorporated into the backbone of the copolymer, or can be attached as a pendant group from the copolymer backbone. The functional group typically will be polar and contain hetero atoms such as P, O, S, N, halogen and/or boron. It can be attached to the saturated hydrocarbon part of the copolymer via substitution reactions or to an olefinic portion via addition or cycloaddition reactions. Alternatively, the functional group can be incorporated into the copolymer by oxidation or cleavage of a small portion of the end of the copolymer (e.g. as in ozonolysis).

The function of dispersants is to maintain materials which are insoluble in oil (and which result from oil use) in suspension in the fluid thus preventing sludge flocculation and precipitation. Suitable dispersants include, for example, dispersants of the ash-producing (also known as detergents) and ashless type, the latter type being preferred. The derivatized copolymer compositions of the present invention, can be used as ashless dispersants and multifunctional viscosity index improvers in lubricant and fuel compositions. Generally, a copolymer containing a reactive moiety, with or without further functionalization, is mixed with at least one amine to form dispersant additives.

The copolymer of the invention polymer can be used as a dispersant or multifunctional viscosity modifier if the latter also contains a group capable of performing the requisite dispersancy function. The copolymer as synthesized contains ethylenic functionality as well as a residue or moiety from the polar comonomer. In addition, the copolymer can be modified to introduce other functional groups to enable the copolymer to participate in a variety of derivatizing chemical reactions. These derivatized copolymers can have the requisite properties for a variety of uses including use as dispersants and viscosity modifiers. For the purposes of this disclosure a derivatized copolymer is one which has been chemically modified to perform one or more functions in a significantly improved way relative to the unfunctionalized copolymer and/or the functionalized copolymer. Representative of such functions, are dispersancy and/or viscosity modification in lubricating oil compositions.

The derivatizing compound typically contains at least one reactive derivatizing group selected to react with the reactive or functional groups of the copolymer by various reactions. Representative of such reactions are nucleophilic substitution, transesterification, salt formation, and the like. The derivatizing compound preferably also contains at least one additional group suitable for imparting the desired properties to the derivatized polymer, e.g., polar groups. Thus, such derivatizing compounds typically will contain one or more groups including amine, hydroxy, ester, amide, imide, thio, thioamido, oxazoline, or carboxylate groups or form such groups at the completion of the derivatization reaction. Additionally, the functionalized copolymer can be reacted with basic metal salts to form metal salts of the polymer; preferred metals are Ca, Mg, Cu, Zn, Mo, and the like.

Suitable properties sought to be imparted to the derivatized copolymer include one or more of dispersancy, multifunctional viscosity modification, antioxidancy, friction modification, antiwear, antirust, seal swell, and the like. The preferred properties sought to be imparted to the derivatized copolymer include dispersancy (both mono- and multifunctional) and viscosity modification, primarily with attendant secondary dispersancy properties. A multifunctional dispersant typically will function primarily as a dispersant with attendant secondary viscosity modification.

While the techniques for derivatization and further functionalization for preparing multifunctional viscosity modifiers (also referred to herein as multifunctional viscosity index improvers or MFVI) are the same as for ashless dispersants (see below), the functionality of a functionalized copolymer intended for derivatization and eventual use as an MFVI will be controlled to be higher than functionalized copolymer intended for eventual use as a dispersant. This stems from the difference in Mn of the MFVI copolymer backbone vs. the Mn of the dispersant copolymer backbone. Accordingly, it is contemplated that an MFVI will be derived from functionalized copolymer having typically up to about one and at least about 0.5 functional groups, for each 20,000, preferably for each 10,000, most preferably for each 5,000 for each 1,000 Mn molecular weight segment in the backbone polymer.

The derivatized copolymers include the reaction product of the POH copolymer with an amine reactant to form oil soluble amides.

Derivatization by Amine Compounds

Useful amine compounds for derivatizing the POH copolymers of the invention, with or without further functionalization of the copolymer itself, comprise at least one amine and can comprise one or more additional amine or other reactive or polar groups. Where the functional group is a carboxylic acid, carboxylic ester or thiol ester, it reacts with the amine to form an amide. Preferred amines are aliphatic saturated amines. Non-limiting examples of suitable amine compounds include: 1,2-diaminoethane, 1,3-diaminopropane; 1,4-diaminobutane; 1,6-iaminohexane; polyethylene amines such as diethylene triamine; triethylene tetramine; tetraethylene pentamine; etc. (Amine derivatization of POH polymers and production of dispersants and lubricant additives therefrom can be carried out according to the general teachings in WO 95135329, published Dec. 28, 1995; incorporated herein for the purposes of U.S. prosecution).

Other useful amine compounds include: alicyclic diamines such as 1,4-di(aminomethyl) cyclohexane, and heterocyclic nitrogen compounds such as imidazolines. Mixtures of amine compounds may advantageously be used. Useful amines also include polyoxyalkylene polyamines. A particularly useful class of amines are the polyamido and related amines.

For the preferred polyamine dispersant of this invention, the novel preferred compositions allow the benefit of using higher molecular weight backbones without the limitation of low nitrogen content and the debit of high viscosities.

Polyamines containing one primary amino group and 1–10 secondary or tertiary amino groups are particularly useful (Referred to herein as "Type I" amines). For lubricant applications, polyamines with 3–8 secondary or tertiary amino groups are preferred. For fuel applications polyamines with 1–secondary or tertiary amino groups are preferred. These polyamines may optionally contain oxygen and sulfur atoms as part of the molecule. The amino groups and the oxygen and sulfur are generally separated from each other by hydrocarbylene groups containing from 1–6 carbons. The polyamines could contain heterocycles as part of their structure.

The preferred polyamines contain only one primary amine per molecule; they are also referred to hereinafter as "one armed polyamines". However, as the number of nitrogen atoms in the polyamines increases, some branching could occur giving mixtures of polyamines containing primarily one amino group with some molecules containing more than one primary amino group. To minimize the viscosity of the final product and maximize the nitrogen content, polyamines with the least amount of branching are particularly preferred.

In general, these one armed polyamines belong to two groups: (1) nonvolatile and (2) volatile amines. Volatile one armed polyamines are considered those polyamines that can be distilled during a stripping step of the process if any remain unreacted as free amine. Volatile amines can be used in large excess to facilitate the completion of the reaction in the shortest possible time since the unreacted amines can be recovered and reused. The stoichiometry of the nonvolatile amine is limited to about one primary amino group per carbonyl group to avoid residual unreacted polyamine in the dispersant mixture.

One type of one armed polyamine can be represented by the formula:

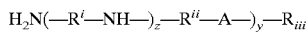

Wherein:

$R^i$ and $R^{ii}$ are hydrocarbyl groups of from one to six carbons;
$R^{iii}$ is a hydrocarbyl group containing from one to 40 carbons or a heterocyclic structure containing N, and/or S, and/or O;
A is oxygen or sulfur;
z=1 to 10; and
y=0 to 1.

As used herein the term "hydrocarbyl" denotes a group having a carbon atom directly attached to the remainder of the molecule and having predominantly hydrocarbon character within the context of this invention and includes polymeric hydrocarbyl radicals. Such radicals include the following:

(1) Hydrocarbon groups; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, the two indicated substituents may together form a cyclic radical). Such radicals are known to those skilled in the art; examples include methyl, ethyl, butyl, hexyl, octyl, decyl, dodecyl, tetradecyl, octadecyl, eicosyl, cyclohexyl, phenyl and naphthyl (all isomers being included).

(2) Substituted hydrocarbon groups, that is, radicals containing non-hydrocarbon substituents which do not alter predominantly hydrocarbon character of the radical. Those skilled in the art will be aware of suitable substituents (e.g., halo, hydroxy, alkoxy, carbalkoxy, nitro, alkylsulfoxy).

(3) Hetero groups; that is, radicals which, while predominantly hydrocarbon in character, contain atoms other than carbon present in a chain or ring otherwise composed of carbon atoms. Suitable hetero atoms will be apparent to those skilled in the art and include, for example, nitrogen, particularly non-basic nitrogen, oxygen and sulfur.

In general, no more than about three substituents or hetero atoms, and preferably no more than one, will be present for each 10 carbon atoms in the hydrocarbon-based radical. Polymeric hydrocarbyl radicals are those derived from hydrocarbon polymers, which may be substituted and/or contain hetero atoms provided that they remain predominantly hydrocarbon in character.

One method to prepare these one armed polyamines consists of stepwise reaction of known alcohols, mono or polyamines with acrylonitrile followed by hydrogenation. The following is a partial list of these polyamines:

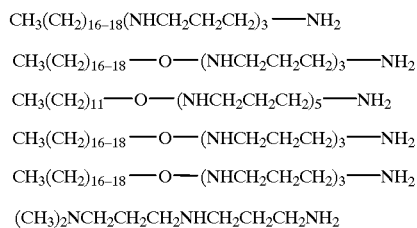

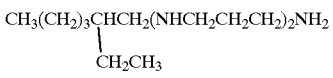
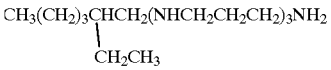
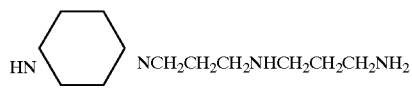
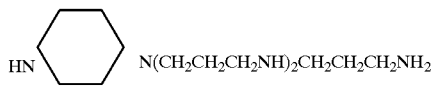
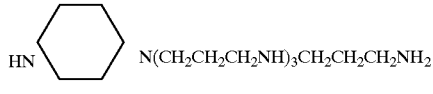
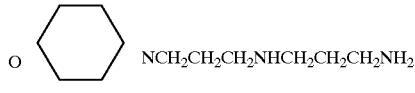
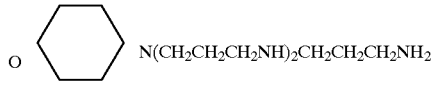
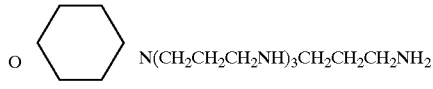
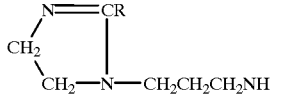
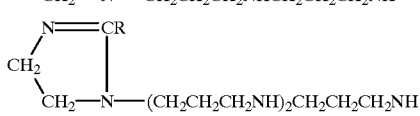

Derivatization with amines can also be conducted using amines containing more than one primary amino group, including polyamines, in combination with the use of chain-stopping or end-capping reactants to prevent gel formation (Referred to herein as "Type II" amines). (Amine derivatization of POH polymers using polyamines and production of dispersants and lubricant additives therefrom can be carried out according to the general teachings in U.S. Ser. No. 338,287, filed Nov. 10, 1994, continuation of U.S. Ser. No. 991,837, filed Dec. 17, 1992 (now abandoned); incorporated herein for purposes of U.S. prosecution). A particularly useful class of polyamines comprise bis(p-amino cyclohexyl) methane (PACM) and oligomers and mixtures of PACM with isomers and analogs thereof containing on average, from 2 to 6 or higher (usually 3 to 4) cyclohexyl rings per PACM oligomer molecule. The total nitrogen content of the PACM oligomers will comprise generally from 8 to 16 wt. %, and preferably from 10 to 14 wt. %. The PACM oligomers can be obtained, e.g., by fractionation, or distillation, as a heavies by-product or bottoms from the PACM-containing product produced by high pressure catalytic hydrogenation of methylene-dianiline.

Still another useful class of Type II amines are the poly-amido and related amines which comprise reaction products of a polyamine and an alpha, beta unsaturated compound. Any polyamine, whether aliphatic, cycloaliphatic, heterocyclic, etc., (but not aromatic) can be employed provided it is capable of adding across the acrylic double bond and amidifying with for example the carbonyl group of an acrylate-type compound or with the thiocarbonyl group of a thioacrylate-type compound.

The hydrocarbyl groups of the alpha, beta unsaturated compound can comprise alkyl, cycloalkyl, or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of the hydrocarbyl groups are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more are heterocyclic, the heterocyclic group generally consists of a compound having at least one ring of 6 to 12 members in which on or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

Examples of the alpha, beta-ethylenically unsaturated carboxylate compounds useful for reaction with the polyamine are acrylic acid, methacrylic acid, the methyl, ethyl, isopropyl, n-butyl, and isobutyl esters of acrylic and methacrylic acids, and 2-butenoic acid.

Various types of alpha, beta ethylenically unsaturated compounds may be employed, including:

(a) carboxylate thioester compounds; examples of these compounds are methylmercapto 2-butenoate and ethylmercapto 2-hexenoate;

(b) carboxyamide compounds; examples of these compounds area 2-butenamide and 2-hexenamide;

(c) thiocarboxyamide compounds; examples are 2-butenthioic acid and 2-hexenthioic acid;

(d) dithioic acid and acid ester compounds; examples are 2butendithioic acid and 2-hexendithioic acid; and (e) thiocrboxyamide compounds; examples of these compounds are 2-butenthioamide and 2-hexenthioamide.

Preferred compounds for reaction with the polyamines in accordance with this invention are lower alkyl esters of acrylic and (lower alkyl) substituted acrylic acid. In the preferred embodiments these compounds are acrylic and methacrylic esters such as methyl or ethyl acrylate, methyl or ethyl methacrylate. When the selected alpha, beta-unsaturated compound contains oxygen, the resulting reaction product with the polyamine contains at least one amido linkage (—C(O)N<) and such materials are herein termed "amido-amines." Similarly, when the selected alpha, beta unsaturated compound contains sulfur, the resulting reaction product with the polyamine contains thioamide linkage (—C(S)N<) and these materials are herein termed "thioamido-amines." Generally, equimolar amounts of polyamine and alpha, beta ethylenically unsaturated carboxylate yields a more linear amido-amine whereas an excess of alpha, beta unsaturated compound tends to yield an amido-amine which is crosslinked. Preferably, the amido-amines are not crosslinked to a substantial degree; more preferably they are substantially linear.

The reaction can be carried out at any suitable temperature, generally below 100° C., for example 80–90° C. Reaction time can vary from about 2 to 30 hours; such as 5 to 25 hours; preferably 3 to 10 hours.

When the post-treating reactant comprises a polyfunctional compound, i.e. a compound containing more than one reactive group, it is necessary to use sufficient chain-stopping or end-capping reactant in combination with the polyfunctional post-treating reactant to ensure that the derivatized product mixture will be gel-free.

The chain-stopping or end-capping reactants contemplated for use in this aspect of the invention include monofunctional reactants which are capable of reacting with reactive amine groups present in the polyfunctional reactants of the Type II amines or with the polar moiety or reactive groups which are grafted or otherwise attached to the POH copolymer to inhibit cross linking and gelation and/or viscosity increase due to any further reaction of unreacted amino groups in the aminated or modified POH copolymer. Preferred chain-stopping or end-capping reactants include, for example, hydrocarbyl substituted dicarboxylic anhydride or acid, preferably succinic anhydride or acid, having from about 12 to 400 carbons in the hydrocarbyl group; long chain monocarboxylic acid of the formula RCOOH where R is a hydrocarbyl group of 12 to 400 carbons in the hydrocarbyl group; alcohol compounds having only a single hydroxy group per molecule; and amine compounds having only a single reactive amine group per molecule. The hydrocarbyl groups are essentially aliphatic and include alkenyl and alkyl groups. The longer chain acids and anhydrides are preferred, particularly when the grafting reaction is carried out in lubricating oil because of their ability to impart dispersancy to reacted oil molecules as well as their greater solubilizing effect. In one preferred embodiment, the chain-stopping or end-capping reactant comprises a $C_{12}$ to $C_{49}$ hydrocarbyl substituted succinic anhydride, e.g. a $C_{12}$ to $C_{18}$ hydrocarbyl substituted succinic anhydride. In other preferred embodiments, the hydrocarbyl substituent contains from 50 to 400 carbon atoms.

Primarily because of its ready availability and low cost, the hydrocarbyl portion, e.g. alkenyl groups, of the carboxylic acid or anhydride is preferably derived from a polymer of a $C_2$ to $C_5$ monoolefin, said polymer generally having a Mn of about 140 to 6,500, e.g. 700 to 5,000, most preferably 700 to 3,000. Particularly preferred polymer is polyisobutylene. Particularly preferred chain-stopping reactants include polyisobutylene succinic anhydride wherein the Mn of the polyisobutylene portion is from 700 to 2,500.

Alcohols having a single reactive hydroxy group per molecule useful as chain-stopping or end-capping reactants generally comprise from 4 to 8 carbon atoms and include, for example, $C_4$–$C_8$ aliphatic alcohols such as butanol, pentanol and hexanol. The use of alcohols having less than 4 carbon atoms generally is to be avoided because of their low volatility. Alcohols having more than about 8 carbon atoms generally are to be avoided since it is difficult to remove unreacted higher molecular weight alcohols from the derivatized product and since the presence of unreacted higher molecular weight alcohols in the product mixture can result in dispersant additives having less favorable viscometric properties.

The aforesaid post-treating, amine reactants having more than one reactive amino group and the chain-stopping or end-capping reactants may be pre-reacted with the chain-stopping or end-capping reactant generally being attached to the post-treating reactant through salt, imide, amide amidine, ester, or other linkages so that a single reactive group of the post-treating reactant is; still available for reaction with the reactive moieties of the POH copolymer. A convenient source of these prereacted materials are the well-known carboxylic: acid derivatives such as succinimides used as lubricating oil dispersants, provided they retain reactive amine and/or hydroxy groups capable of further reaction with the POH copolymer.

The POH copolymer, with or without further functionalization, can be reacted with an individual amine reactant or such reactant and chain-stopping or end-capping reactant or any combination of two or more of any of these reactants; that is, for example, one or more monoreactive amines or polyamines, so long as sufficient monoreactive reactant is used when a reactant having more than one reactive group is used to ensure a gel-free reaction.

The reaction between the copolymer and the amine and/or chain-stopping or end-capping reactants is readily accomplished, for example, by heating a solution containing 5 to 95 wt. percent of the copolymer in a substantially inert organic solvent or diluent at from 100 to 250° C., preferably 125 to 175° C., generally for 1 to 10. e.g., 2 to 6 hours. Suitable diluents include, for example, aliphatic, cycloaliphatic, and aromatic hydrocarbons, as well as the corresponding halogenated hydrocarbons, particularly chlorinated hydrocarbons. These diluents are exemplified by benzene, toluene, chlorobenzenes, hexane, heptane, or mixtures of these. Mineral oils particularly low viscosity mineral oils are very good diluents. Preferred diluents are mineral oils of lubricating viscosity.

Reaction ratios of copolymer to equivalents of amine reactant, and chain stopping or end-capping reactants described herein, can vary considerably, depending, e.g., on the reactants and type of bonds formed. Generally, when an amine compound is reacted with a copolymer, from 0.05 to 4.0, preferably from 0.5 to 2.0, e.g., 0.6 to 1.5, moles of polar moiety content is used, per equivalent of amine reactant.

A preferred group of ashless dispersants, in accordance with the present invention, are those derived from POH copolymer reacted with polyethylene amines, e.g., tetraethylene pentamine, pentaethylene hexamine, polyoxyethylene or polyoxypropylene amines, e.g., polyoxypropylene diamine, and with polyisobutylene succinic anhydride chain-stopping reactant. Another preferred group of ashless dispersants are those derived from POH copolymer reacted with monofunctional heterocyclic amines, e.g., N-(3-aminopropyl) morpholine.

Supplemental or further functionalization of the copolymer with functional groups typically relies on ethylenic unsaturation, preferably terminale ethylenic unsaturation, present in the copolymer for reaction with a functional compound containing or constituting the functional group. Thus, reaction of these functional compounds and the copolymer can occur through a variety of mechanisms. Useful and preferred functional groups include halogen, carboxyl materials present as acids, esters, salts, or anhydrides, alcohols, amines, ketones, aldehydes and the like.

Useful functionalization reactions which are generally well known to those skilled in the art include the following. However, the unique features of the POH copolymers of the present invention provide significant advantages not previously available:

(A) reaction of the copolymer at its point of unsaturation with carbon monoxide using a Koch-type reaction wherein an acid group such as an iso acid or neo acid is formed. Functionalization of POH copolymers by means of the Koch reaction and production of derivatives therefrom can be carried out according to the general teachings in WO /9413709, published June 23, 1994 (incorporated herein for the purposes of U.S. prosecution). However, use of the Koch reaction with ethylene/α-olefin copolymers and α-olefin homopolymers containing primarily vinylidene and/or trisubstituted double bonds (e.g., produced by means of metallocene catalyst systems from ethylene and α-olefin feed streams) leads to derivatives containing more than 50% neoacid derivatives. The steric hindrance about the α-carbon of such neoacid derivatives makes such materials more difficult to condense with polyamines to form dispersants. High temperatures and aryl leaving groups are required in order to drive the reaction to completion. The POH copolymer of the present invention which contains a significant concentration of vinyl and/or vinylene terminated copolymer chains results in significantly more isoacid structures which are easier to derivatize and therefore more desirable. In particular, the chemically modified POH copolymers of the present invention typically contain less than 50% of neo-substituted carbonyl groups, preferably less than 40%, more preferably less than 30% and most preferably less than 20% neo-substituted carbonyl groups. For example, the modified POH copolymers of the present invention typically will contain from about 5 to less than about 50% neo-substituted carbonyl groups; preferably from about 5 to about 40%; more preferably from about 5 to about 30%; most preferably from about 5 to about 25% of such groups;

(B) hydroformylation or oxycarbonylation with cobalt or rhodium catalysts introduce a carbonyl group at the less hindered end of a trisubstituted double bond, leading to isoaldehydes and acids (see, WO/95/124431, published Sep. 14, 1995; incorporated herein by reference for the purposes of U.S. prosecution); amine derivatives useful as derivatives can be formed by either a single step aminomethylation process or a two step hydroformylation and reductive amination process. However, vinyl olefins which are present at higher concentrations in the POH copolymers of this invention, lead to the completely unhindered primary functional group which is easiest to derivatize. Consequently, the presence of vinyl olefins enables the condensation of the polymeric acid with polyamines directly without the necessity of phenols as leaving groups;

(C) acyl functionalization, and in particular, the preferred maleation reaction, which is the reaction of the copolymer at the point of unsaturation with maleic acid or anhydride. A related reaction is the alternating copolymerization of maleic anhydride with copolymers containing vinylidene unsaturation, but the degree of polymerization in such systems is limited, e.g., from about 5–10. In contrast, the vinyl groups of the POH copolymers of the present invention are much more amenable to radical initiated copolymerization leading to a significantly higher degree of polymerization (DP), e.g., a DP greater than about 20. The functionalized reaction product can be further reacted with, e.g., amines to produce dispersant products. When the reactant is a polyamine, polyol or aminoalcohol, the reaction is conducted in the presence of sufficient chain-stopping or end-capping co-reactant to ensure a gel-free product (see WO/94/13761, published Jun. 23, 1994, incorporated herein by reference for the purposes of U.S. prosecution). Alternatively, functionatization can be accomplished by reaction of the copolymer with an unsaturated functional compound using the "ene" reaction absent halogenation;

(D) halogenation of the copolymer at the olefinic bond and subsequent reaction of the halogenated copolymer with an ethylenically unsaturated functional compound or an amine;

(E) reaction of the copolymer with the functional compound by free radical addition using a free radical catalyst; and (F) reaction of the copolymer by air oxidation methods, epoxidation, chloroamination or ozonolysis.

(G) reaction of the copolymer with at least one phenol group thus permitting derivatization in a Mannich Base-type condensation (see, for example, U.S. Pat. Nos. 5,128,056 issued Jul. 7, 1992 and U.S. Pat. No. 5,200,103 issued Apr. 6, 1993, each incorporated herein by reference for purposes of U.S. prosecution).

Characterization of the degree to which the copolymer has been functionalized is referred to herein as "functionality". Functionality refers generally to the average number of functional groups present within the copolymer structure per copolymer chain. Thus, functionality can be expressed as the average number of moles of functional groups per "mole of copolymer". When said "mole of copolymer" in the functionality ratio includes both functionalized and unfunctionalized copolymer, functionality is referred to herein as F. When said "mole of copolymer" includes only functionalized copolymer, functionality is referred to herein as F*. Typical analytical techniques employed to determine F* will normally necessitate identification of the weight fraction of functionalized copolymer, based on the total weight of copolymer (functionalized+unfunctionalized) in the sample being analyzed for functionality. This weight fraction is commonly referred to as Active Ingredient or A.I. Since the determination of A.I. is a separate analytical step, it can be more convenient to express functionality as F rather than F*. In any event, both F and F* are alternate ways of characterizing the functionality.

The particular functionality selected, for copolymer intended to be derivatized, will depend on the nature of the derivatization reactions and type and number of chemical linkages established by the derivatizing compound. In most instances, one derivatizing linkage will be formed for each functional group, e.g., each carboxy functional group will form one ester or amide linkage.

Accordingly, while any effective functionality can be imparted to the functionalized copolymer intended for subsequent derivatization, it is contemplated that such functionalities, expressed as F*, can be, for dispersant end uses, typically not greater than 3, preferably not greater than 2, and typically can range from 1 to 3, preferably from 1.5 to 2.5, and most preferably from 1.1 to 2 (e.g. 1.2 to 1.3). F and F* values can be related using the A.I., which for copolymers of the present invention typically are at least 0.50, preferably from 0.65 to 0.99, more preferably from 0.75 to 0.99, yet more preferably 0.85 to 0.99. However, the upper limit of A.I. is typically from 0.90 to 0.99, and more typically 0.90 to 0.95. Where A.I. is 1.0, F=F*.

As indicated above, a functionalized copolymer is one which is chemically modified primarily to enhance its ability to participate in a wider variety of chemical reactions than would otherwise be possible with the unfunctionalized copolymer. In contrast, a derivatized copolymer is one which has been chemically modified to perform one or more functions in a significantly improved way relative to the unfunctionalized copolymer and/or the functionalized copolymer. Representative of such functions, are dispersancy and/or viscosity modification in lubricating oil compositions. Typically, derivatization is achieved by chemical modification of the functionalized copolymer by reaction with at least one derivatizing compound to form derivatized copolymers. The derivatizing compound typically contains at least one reactive derivatizing group capable of reacting with the functional groups of the functionalized copolymers, for example, by nucleophilic substitution, Mannich Base condensation, transesterification, salt formations, and the like. The derivatizing compound preferably also contains at least one: additional group suitable for imparting the desired properties to the derivatized copolymer, e.g., polar groups. Thus, such derivatizing compounds typically will contain one or more groups including amine, hydroxy, ester, amide, imide, thio, thioamido, oxazoline or salt groups derived from reactive metal or reactive metal compounds. Thus, the derivatized copolymers can include the reaction product of the above recited functionalized copolymer with a nucleophilic reactant, which includes, amines, alcohols, aminoalcohols and mixtures thereof, to form oil soluble salts, amides, imides, oxazoline, reactive metal compounds and esters of mono- and dicarboxylic acids, esters or anhydrides. Suitable properties sought to be imparted to the derivatized copolymer include especially dispersancy, but also multifunctional viscosity modification, antioxidancy, friction modification, antiwear, antirust, seal swell, and the like.

Ash-producing detergents can be made using the functionalized copolymers of the present invention as exemplified by oil-soluble neutral and basic salts of alkali or alkaline earth metals with alkyl phenols, alkyl sulfonic acids, carboxylic acids, salicylic acids or organic phosphorus acids characterized by at least one direct carbon-to-phosphorus linkage such as those prepared from the functionalized olefin copolymer of the present invention (e.g., functionalized copolymer having a molecular weight of 1,500) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium. The alkyl groups of the above acids or compounds constitute the copolymer of the present invention. Preferred ash-producing detergents which can be derived from the functionalized copolymers of the present invention include the metal salts of alkyl sulfonic acids, alkyl phenols, sulfurized alkyl phenols, alkyl salicylates, alkyl naphthenates and other oil soluble mono- and dicarboxylic acids. Highly basic (viz., overbased) metal salts, such as highly basic alkaline earth metal alkyl sulfonates (especially Ca and Mg salts) are frequently used as detergents.

The derivatized copolymer compositions of the present invention can be used as ashless dispersants in lubricant and fuel compositions. Ashless dispersants are referred to as being ashless despite the fact that, depending on their constitution, the dispersants may, upon combustion, yield a non-volatile material such as boric oxide or phosphorus pentoxide. The compounds useful as ashless dispersants generally are characterized by a "polar" group attached to a relatively high molecular weight hydrocarbon chain supplied by the copolymer of the present invention. The "polar" group generally contains one or more of the elements nitrogen, oxygen and phosphorus. The solubilizing chains are generally higher in molecular weight than those employed with the metallic based dispersants, but in some instances they may be quite similar. Various types of ashless dispersants can be made by derivatizing the copolymer of the present invention and are suitable for use in the lubricant compositions. The following are illustrative (where reference is made to relevant patents, it is to be understood that the cited patents are incorporated herein for the purposes of U.S. prosecution):

1. Reaction products of functionalized copolymer of the present invention derivatized with nucleophilic reagents such as amine compounds, e.g. nitrogen-containing compounds, organic hydroxy compounds such as phenols and alcohols, and/or basic inorganic materials. More specifically, nitrogen- or ester-containing ashless dispersants comprise members selected from the group consisting of oil-soluble salts, amides, imides, oxazolines and esters, or mixtures thereof, of the copolymer of the present invention, functionalized with mono- and dicarboxylic acids or anhydride or ester derivatives thereof, said copolymer having dispersant range molecular weights as defined hereinabove. At least one functionalized copolymer is mixed with at least one of amine, alcohol, including polyol, aminoalcohol, etc., to form the dispersant additives. One class of particularly preferred dispersants includes those derived from the copolymer of the present invention functionalized mono- or dicarboxylic acid material, e.g. succinic anhydride, and reacted with (i) a hydroxy compound, e.g. pentaerythritol, (ii) a polyoxyalkylene polyamine, e.g. polyoxypropylene diamine, and/or (iii) a polyalkylene polyamine, e.g., polyethylene diamine, tetraethylene pentamine ("TEPA") or triethylene tetramine ("TETA"). Another preferred dispersant class includes those derived from functionalized copolymer reacted with (i) a polyalkylene polyamine, e.g. tetraethylene pentamine, and/or (ii) a polyhydric alcohol or polyhydroxy-substituted aliphatic primary amine, e.g., pentaerythritol or trismethylolaminomethane.

Further enhancements in dispersancy can be achieved by the use of materials known as heavy polyalkylene polyamines ("heavy PAM") to introduce an amine as the polar segment of the dispersant (see, e.g., U.S. Ser. No. 322715 filed Oct. 12, 1994; incorporated herein by reference for the purposes of U.S. prosecution). Generally, heavy PAM is a mixture of higher oligomers of polyalkylene amines (e.g., polyethylene) containing essentially no TEPA, at most small amounts of pentaethylene hexamine ("PEHA"), but primarily oligomers with more than 6 nitrogens and more branching than conventional polyamine mixtures. Specifically, heavy PAM typically contains >28% nitrogen (e.g., >32%), an equivalent weight of primary amine groups of between 120–160 grams per equivalent (e.g., 125–140), more than 6 nitrogen atoms per molecule on the average and more than two primary amines per molecule on the average and essentially no oxygen. Heavy PAM is available commercially (e.g., trade name Polyamine HA-2, Dow Chemical Company) and can also be synthesized from polyethylene or polypropylene polyamine. Reduced levels of free, unreacted polyamine is beneficial to diesel engine and elastomer seal performance in vehicles.

2. Reaction products of the copolymer of the present invention functionalized with an aromatic hydroxy group and derivatized with aldehydes (especially formaldehyde) and amines (especially polyalkylene polyamines), through the Mannich reaction, which may be characterized as "Mannich dispersants".

3. Reaction products of the copolymer of the present invention which have been functionalized by reaction with halogen and then derivatized by reaction with amines (e.g. direct amination), preferably polyalkylene polyamines. These may be characterized as "amine dispersants" and examples thereof are described, for example, in U.S. Pat. Nos. 3,275,554; 3,438,757; 3,454,555; 3,565,804; 3,755,433; 3,822,209 and 5,084,197.

Useful amine compounds for derivatizing functionalized copolymers comprise at least one amine and can comprise one or more additional amines or other reactive or polar groups. Where the functional group is a carboxylic acid, ester or derivative thereof, it reacts with the amine to form an amide. Where the functional group is an epoxy it reacts with the amine to form an amino alcohol. Where the functional group is a halide the amine reacts to displace the halide. Where the functional group is a carbonyl group it reacts with the amine to form an imine. Amine compounds useful as nucleophilic reactants for reaction with the functionalized copolymer of the present invention include those disclosed in U.S. Pat. Nos. 3,445,441, 5,017,299 and 5,102,566. Preferred amine compounds include mono- and (preferably) polyamines, of 2 to 60, preferably 2 to 40 (e.g. 3 to 20), total carbon atoms of 1 to 12, preferably 3 to 12, and most preferably 3 to 9 nitrogen atoms in the molecule. These amines may be hydrocarbyl amines or may be hydrocarbyl amines including other groups, e.g., hydroxy groups, alkoxy groups, amide groups, nitrites, imidazoline groups, and the like. Hydroxy amines with 1 to 6 hydroxy groups, preferably 1 to 3 hydroxy groups, are particularly useful. Preferred amines are aliphatic saturated amines.

The functionalized copolymers, particularly acid functionalized copolymers, of the present invention can be reacted with alcohols, e.g. to form esters. The alcohols may be aliphatic compounds such as monohydric and polyhydric alcohols or aromatic compounds such as phenols and naphthols. The esters may be prepared, for example, by reacting a suitable alcohol or phenol with the acid or anhydride (i.e., functionalized copolymer succinic anhydride). Ester derivatives likewise may be obtained by the reaction of a acid functionalized copolymer with epoxide or a mixture of an epoxide and water. Such reaction is similar to one involving the acid or anhydride with a glycol. For instance, the product may be prepared by the reaction of functionalized copolymer with alkylene oxide to yield half-esters, monoesters or diesters. In lieu of the acid functionalized copolymer, a copolymer functionalized with lactone acid or an acid halide may be used in the processes illustrated above for preparing the ester derivatives of this invention. Such acid halides may be acid dibromides, acid dichlorides, acid monochlorides, and acid monobromides. The derivative compositions produced by reacting functionalized copolymer with alcohols are esters including both acidic esters and neutral esters. Acidic esters are those in which less than all of the functional groups in functionalized copolymer are esterified, and hence possess at least one free functional group. Obviously, acid esters are easily prepared by using an amount of alcohol insufficient to esterify all of the functional groups in the functionalized copolymer.

Procedures are well known for reacting high molecular weight carboxylic acids with alcohols to produce acidic esters and neutral esters. These same techniques are applicable to preparing esters from the functionalized copolymer of this invention and the alcohols described above. All that is required is that the functionalized copolymers of this invention be substituted for the high molecular weight carboxylic acids discussed in these patents, usually on an equivalent weight basis. The following U.S. Patents disclose suitable methods for reacting the functionalized copolymers of this invention with the alcohols described above: U.S. Pat. Nos. 3,331,776; 3,381,022; 3,522,179; 3,542,680; 3,697,428 and 3,755,169.

The hydroxy aromatic functionalized copolymer aldehyde/amino condensates useful as ashless dispersants in the compositions of this invention include those generally referred to as Mannich condensates. Generally they are made by reacting simultaneously or sequentially at least one active hydrogen compound such as a hydrocarbon-substituted phenol (e.g., hydroxy aromatic functionalized copolymer of the present invention), having at least one hydrogen atom bonded to an aromatic carbon, with at least one aldehyde or aldehyde-producing material (typically formaldehyde precursor) and at least one amino or polyamino compound having at least one NH group. Preferred phenolic compounds include the hydroxy aromatic functionalized copolymer and useful amine compounds are well known and referred to above. The amine compounds include primary or secondary monoamines having hydrocarbon substituents of 1 to 30 carbon atoms or hydroxyl-substituted hydrocarbon substituents of 1 to about 30 carbon atoms. Another type of typical amine compound are the polyamines. The materials described in the following patents are illustrative of Mannich dispersants: U.S. Pat. Nos. 3,413,347; 3,697,574; 3,725,277; 3,725,480; 3,726,882; 4,454,059 and 5,102,566.

A useful group of Mannich Base ashless dispersants are those formed by condensing phenol functionalized copolymer with formaldehyde and polyethylene amines, e.g., tetraethylene pentamine, pentaethylene hexamine, polyoxyethylene and polyoxypropylene amines, e.g., polyoxypropylene diamine and combinations thereof. One particularly preferred dispersant comprises a condensation of (A) phenol functionalized copolymer, (B) formaldehyde, (C) a polyoxyalkylene polyamine, e.g., polyoxypropylene diamine, and (D) a polyalkylene polyamine, e.g. polyethylene diamine and tetraethylene pentamine, using about 2 to about 8 moles each of (B) and about 1 to about 4 moles of (C) or (D) per mole of (A).

A useful class of nitrogen-containing condensation products for use in the present invention are those made by a "2-step process" as disclosed in U.S. Pat. No. 4,273,891. Briefly, these nitrogen-containing condensates are made by (1) reacting at least phenol functionalized copolymer of the present invention with a lower aliphatic $C_1$ to $C_7$ aldehyde or reversible copolymer thereof in the presence of an alkaline reagent, such as an alkali metal hydroxide, at a temperature up to about 150° C.; (2) substantially neutralizing the intermediate reaction mixture thus formed; and (3) reacting the neutralized intermediate with at least one compound which contains an amino group having at least one —NH— group. These 2-step condensates can be made from (a) phenol functionalized copolymer and (b) formaldehyde, or reversible copolymer thereof, (e.g., trioxane, paraformaldehyde) or functional equivalent thereof, (e.g., methylol) and (c) an alkylene polyamine such as ethylene polyamines having between 2 and 10 nitrogen atoms.

Condensates made from sulfur-containing reactants also can be used in the compositions of the present invention. Such sulfur-containing condensates are described in U.S. Pat. Nos. 3,368,972; 3,649,229; 3,600,372; 3,649,659 and 3,741,896. These patents also disclose sulfur-containing Mannich condensates.

4. Useful reactive metals or reactive metal compounds are those which will form metal salts or metal-containing complexes with the functionalized copolymer. Metal complexes are typically achieved by reacting the functionalized copolymers with amines and/or alcohols as discussed above and also with complex forming reactants either during or subsequent to amination. Reactive metal compounds for use in the formation of complexes with the reaction products of functionalized copolymer and amines include those disclosed in U.S. Pat. No. 3,306,908. Complex-forming metal reactants include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc). These metals are the so-called transition or coordination metals, i.e., they are capable of forming complexes by means of their secondary or coordination valence.

Processes are disclosed in U.S. Pat. No. 3,306,908 and Re. 26,433 which are applicable to the carboxylic derivative compositions of the functionalized copolymer of this invention with the amines as described above by substituting, on an equivalent basis, the functionalized copolymer of this invention with the high molecular weight carboxylic acid functionalized polymer of U.S. Pat. No. 3,306,908 and carboxylic acylating agents of Re. 26,433. Similarly, the metal salts of U.S. Pat. No. 3,271,310 can be adapted to make the present functionalized copolymer.

Lubricant and Fuel-Oil Applications

The copolymer of this invention, having a suitable number average molecular weight, may be used as a synthetic base oil. The functionalized copolymer, in addition to acting as intermediates for dispersant manufacture, can be used as a molding release agent, molding agent, metal working lubricant, point thickener and the like. The primary utility for the above-described materials, from copolymer all the way through and including post-treated derivatized copolymer, is as an additive for oleaginous compositions. For ease of discussion, the above-mentioned materials are collectively and individually referred to herein as additives when used in the context of an oleaginous composition containing such "additives". Accordingly, the additives of the present invention may be used by incorporation and dissolution into an oleaginous material such as fuels and lubricating oils. When the additives of this invention are used in normally liquid petroleum fuels such as middle distillates boiling from 65° C. to 430° C., including kerosene, diesel fuels, home heating fuel oil, jet fuels, etc., there is typically used a concentration of the additives in the fuel in the range of from 0.001 to 0.5, and preferably 0.005 to 0.15 wt. %, based on the total weight of the composition. Useful compositions and additives are disclosed in U.S. Pat. No. 5,102,566.

The additives of the present invention, particularly those adapted for use as dispersants, can be incorporated into a lubricating oil in any convenient way. Thus, they can be blended with other additives prior to blending with the oil or added directly to the oil by dispersing or dissolving the same in the oil at the desired level or concentration of the additive; such blending steps can be conducted at room temperature or elevated temperatures. Alternatively, the additives can be blended with a suitable oil-soluble solvent and base oil to form a concentrate, and then blending the concentrate with a lubricating oil basestock to obtain the final formulation. Such dispersant concentrates will typically contain (on an active ingredient (A.I.) basis) from 10 to 80 wt. % typically 20 to 60 wt. %, and preferably from 40 to 50 wt. %, additive, and typically from 40 to 80 wt. %, preferably from 40 to 60 wt. %, base oil, i.e., hydrocarbon oil based on the concentrate weight. The lubricating oil basestock for the additive typically is adapted to perform a selected function by the incorporation of additional additives therein to form lubricating oil compositions (i.e., formulations). Usually concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, the additives of the present invention and formulations containing them would usually be employed in the form of a 40 to 50 wt. % concentrate, for example, in a lubricating oil fraction.

The additives of the present invention are primarily useful in lubricating oil compositions which employ a base oil in which the additives are dissolved or dispersed therein. Such base oils may be natural or synthetic. Natural base oils include mineral lubricating oils which may vary widely as to their crude source, e.g., whether paraffinic, naphthenic, mixed paraffinic-naphthenic, and the like; as well as to their formation, e.g., distillation range, straight run or cracked, hydrofined, solvent extracted and the like. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention. The additives of the present invention will be generally used in admixture with a lube oil basestock, comprising an oil of lubricating viscosity, including natural and synthetic lubricating oils and mixtures thereof. Useful oils are described in U.S. Pat. Nos. 5,017,299 and 5,084,197. Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Lubricating oils useful in the present invention are typically based on a hydrocarbon mineral oil having a viscosity of about 2–40 centistokes (ASTM D-445) at 100° C. Oils of lubricating viscosity derived from coal or shale are also useful base oils. Lubricating oil basestocks comprised of a mixture of a hydrocarbon mineral oil and up to about 50 weight % of a synthetic lubricating oil are also considered suitable. Synthetic lubricating oils include hydrocarbon oils and halo-substituted hydrocarbon oils such as polymerized and interpolymerized olefins, esters of dibasic acids and complex esters derived from monobasic acids and complex esters derived from monobasic acids, polyglycols, dibasic acids and alcohols. Alkylene oxide copolymers and interpolymers and derivatives thereof where the terminal hydroxyl groups have been modified by esterification, etherification, etc., constitute another class of known synthetic lubricating oils. Other suitable classes of synthetic lubricating oils comprise the esters of dicarboxylic acids and silicon and silicate based oils. Additionally, unrefined, refined and rerefined oils can be used in the lubricants of the present invention.

The POH copolymers of the present invention are useful in oil compositions, for example fuel oil compositions, and particularly in fuel oil compositions susceptible to wax formation at low temperatures. Heating oils and other distillate petroleum fuels, for example, diesel fuels, contain alkanes that at low temperatures tend to precipitate as large crystals of wax in such a way as to form a gel structure which causes the fuel to lose its ability to flow. The lowest temperature at which the fuel will flow is known as the pour point.

As the temperature of the fuel falls and approaches the pour point, difficulties arise in transporting the fuel through lines and pumps. Further, the wax crystals tend to plug fuel lines, screens and filters at temperatures above the pour point. These problems are recognized in the art and various additives have been proposed, many of which are in commercial use, for depressing the pour point of fuel oils. Similarly, other additives have been proposed and are in commercial use for reducing the size and changing the shape of wax crystals that do form. Smaller size crystals are desirable since they are less likely to clog a filter; certain additives inhibit the was from crystallizing as platelets and cause it to adopt an acicular habit, the resulting needles being more likely to pass through a filter than are platelets. The additives may also have the effect of retaining in suspension in the fuel the crystals that have formed, the resulting reduced settling also assisting in prevention of blockages.

Preferred POH copolymers of the invention may be further characterized by their beneficial effect on pour point, as determined by ASTM Method No. D97. In this test, measurements are made on solutions comprising a specific concentration of the copolymer of the invention in a standard mineral lubricating oil (S150N). The pour point of an oil composition is the lowest temperature at which it will flow when chilled in a specific manner; here, the manner prescribed by ASTM Method No. D97; pour point characterizes the low temperature flow or pumpability properties of fluids such as lubricating and fuel oils. Useful additives can also be produced from the POH copolymers of the invention for use in various middle distillate fuel compositions for lowering the pour point and controlling the size of wax crystals in these products; such additives are known as wax crystal modifiers (WCM). The copolymers of the present invention are also useful as "co-additives" with another WCM of the present invention or in combination with prior art WCM additives. Since certain wax crystal modifiers are capable of affecting the size and number of wax crystals (e.g., affecting crystal nucleation processes) and others are capable of affecting the shape of such crystals (e.g., affecting crystal growth processes), preferred performance may be achieved by the judicious combination of WCM additives that are effective in these different respects; each having somewhat different structural characteristics to accomplish their result. For example, copolymers of the invention useful for the purpose of affecting nucleation can have fewer than about 10 branches per 100 carbon atoms; useful copolymers can have fewer than 6 branches, e.g., about 5 branches per 100 carbon atoms.

The general term "lubricating oil flow improver" (LOFI) is also used to identify those additives which modify the size, number and growth rate of wax crystals in lube oils in such a way as to impart improved low temperature handling, pumpability and/or vehicle operability. Copolymers or additives containing copolymers, which can also be in various functionalized or derivatized forms, are used for this purpose. In one type of LOFI, the copolymer backbone methylene sequences which are randomly distributed are interrupted by branches (and other con-crystallizable segments). It is the sequences that are believed to associate or co-crystallize with the wax crystals and the branches which inhibit or interfere with further crystal growth that would ordinarily occur in their absence. Where the branches are methylene side chains of increased length, such side chains can be particularly effective in treating lube oils containing isoparaffins and n-paraffins. The effectiveness of an additive bears a complex relationship to copolymer structure and is not readily predictable.

A requirement of any dispersant additive is that it not adversely affect (i.e., does not significantly increase) the pour point of the lubricating oil composition to which it is added. It is generally accepted that the pour point behavior of dispersant additives is largely determined by the pour point behavior of the copolymer from which they are derived. More particularly, the addition to a lubricating oil composition of an effective amount of a dispersant additive produced by the functionalization and/or derivatization, as hereinafter described, of the POH copolymer does not negatively alter the pour point of the composition in a significant way.

The POH copolymers of this invention are also capable of functioning as a wax crystal modifier (WCM) in fuel oil compositions. In this application, performance can be measured by a pour point test, the change in pour point, measured in degrees Centigrade, when an effective amount of the WCM is present in the fuel oil. Performance can also be measured by a filterability test, e.g., the cold filter plugging point ("CFPP") test, which is known to those skilled in the art. The extent of modification of the wax crystal and the effectiveness of the WCM will vary depending on the structural configuration of the WCM. This, in turn, is affected by the monomer used for polymerization, e.g., whether a $C_8$ or a $C_{14}$ is used, or a mixture of monomers. Furthermore, the extent of partial "chain straightening" effected by the particular catalyst employed (as explained elsewhere), will vary the performance of the POH copolymer as a wax crystal modifier. Selection of monomer, catalyst and polymerization conditions can be made in order to maximize performance of the resulting POH copolymer in this application.

Among other factors affecting pour point and/or CFPP performance, besides the extent of branching, are the apparent ethylene content and the number average molecular weight of the copolymer. Since higher copolymer molecular weight generally increases the viscosity of the oil in which it is dissolved, the choice of copolymer molecular weight should be made with consideration of how it will affect the flow properties of the resulting composition. Similarly, higher levels of apparent ethylene sequences results in the potential for greater participation in the crystallization process and solubility in the oil. The extent and nature of branching can serve as a fine tuning variable to "balance" the extent of crystallinity of the WCM itself so that it remains soluble in the oil and still functions to interact with the wax as required.

Lubricating oil formulations containing the additives of the present invention conventionally contain other types of additives that contribute other characteristics that are required in the formulation. Typical of such other additives are detergent/inhibitors, viscosity modifiers, wear inhibitors, oxidation inhibitors, corrosion inhibitors, friction modifiers, foam inhibitors, rust inhibitors, demulsifiers, lube oil flow improvers, and seal swell control agents, etc. Some of the additives can provide multiple effects e.g., a dispersant oxidation inhibitor. Compositions, when containing these additives, typically are blended into the base oil in amounts which are effective to provide their normal attendant function. Representative effective amounts of such additives are illustrated as follows:

| Compositions | Range Broad Wt % | Preferred Wt % |
| --- | --- | --- |
| Viscosity Index Improver | 1–12 | 1–4 |
| Corrosion Inhibitor | 0.01–3 | 0.01–1.5 |

-continued

| Compositions | Range Broad Wt % | Preferred Wt % |
| --- | --- | --- |
| Oxidation Inhibitor | 0.01–5 | 0.01–1.5 |
| Dispersant | 0.1–10 | 0.1–5 |
| Lube Oil Flow Improver | 0.01–2 | 0.01–1.5 |
| Detergents and Rust Inhibitors | 0.01–6 | 0.01–3 |
| Pour Point Depressant | 0.01–1.5 | 0.01–1.5 |
| Anti-Foaming Agents | 0.001–0.1 | 0.001–0.01 |
| Antiwear Agents | 0.001–5 | 0.001–1.5 |
| Seal Swellant | 0.1–8 | 0.1–4 |
| Friction Modifiers | 0.01–3 | 0.01–1.5 |
| Lubricating Base Oil | Balance | Balance |

When the copolymers of this invention are employed in lubricating oils as viscosity index (VI) improvers or viscosity modifiers their concentration can vary broadly from about 0.001 to 49 wt. %. The proportions giving the preferred results will vary somewhat according to the nature of the lubricating oil basestock and the specific purpose for which the lubricant is to serve in a particular application. When used as lubricating oils for diesel or gasoline engine crankcase lubricants, the copolymer concentrations are within the range of about 0.1 to 15.0 wt. % of the total composition which are amounts effective to provide viscosity modification and/or VI improvement.

When other additives are employed, it may be desirable, although not necessary, to prepare additive concentrates comprising concentrated solutions or dispersions of the subject additives of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the subject additives of the present invention can be added to small amounts of base oil or other compatible solvents along with other desirable additives to form additive-packages containing active ingredients in collective amounts of typically from 2.5 to 90%, and preferably from 15 to 75%, and most preferably from 25 to 60% by weight additives in the appropriate proportions with the remainder being base oil. The final formulations may employ typically 10 wt. % of the additive-package with the remainder being base oil. (All weight percents expressed herein, unless otherwise indicated, are based on active ingredient (A.I.) content of the additive, and/or upon the total weight of any additive-package, or formulation which will be the sum of the A.I. weight of each additive plus the weight of total oil or diluent).

EXAMPLES

The following examples are given as illustrations of the claimed invention. It should be understood, however, that the invention is not limited to the specific details set forth in the examples. All parts and percentages in the examples are by weight unless otherwise specified.

Example 1

Ethylene (E), propylene (P) or butene-1 (B) is copolymerized with methyl acrylate (MA), tert-butyl acrylate (tBuA) or methyl vinyl ketone (MVK) at ambient pressure or elevated pressure, as described below. The catalyst system is prepared according to the disclosure in J. Am. ChemSoc. 1996, 118, 267–268 (including supporting information); the catalyst structure is shown in A, below. Comonomer concentration (moles) is varied from 0.5 to 6.0.

Ambient pressure polymerization: A Schlenk flask containing the catalyst precursor is cooled to −78° C., evacuated, and placed under the α-olefin atmosphere (e.g., ethylene, propylene or butene-1). Methylene chloride and the acrylate are added to the cold flask via syringe. The solution is allowed to warm to room temperature with stirring. Following polymerization for the desired reaction time, the reaction mixture is added to approx. 600 mL or methanol to precipitate the polymer. The methanol is decanted and the polymer is dissolved in approx. 600 mL of $Et_2O$ or petroleum ether. The solution is filtered through a plug of celite and/or neutral alumina, the solvent is removed and the polymer is dried in vacuo for several days. The copolymers are isolated as viscous oils.

Elevated pressure polymerization: A mechanically stirred, 300 mL Parr® reactor is used which is equipped with an electric heating mantle controlled by a thermocouple dipping into the reaction mixture. A solution of 0.1 mmol of catalyst precursor in methylene chloride, containing the comonomer (5–50 mL, total volume of the liquid phase: 100 mL), is transferred via cannula to the reactor under a nitrogen atmosphere. After repeatedly flushing with ethylene or propylene, constant pressure is applied by continuously feeding the gaseous olefin and the contents of the reactor are vigorously stirred. After polymerization, the gas is vented. Volatiles are removed from the reaction mixture in vacuo, and the polymer is dried under vacuum overnight. Residual comonomer is removed by precipitating the polymer from methylene chloride solution with methanol.

Catalyst structure A:

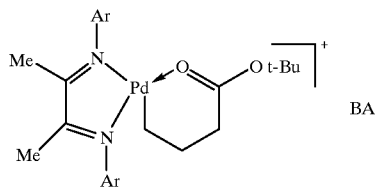

BA

Where
$Ar=2,6-C_6H_3-(i-Pr)_2$ and
$BAF=B[3,5-C_6H_3-(CF_3)_2]_4-$

Several polymerization runs are made under the following conditions to prepare the POH copolymers of the present invention:

| Run | Monomers | Pressure |
|-----|----------|----------|
| 1 | E/MA | Elevated |
| 2 | E/tBuA | Ambient |
| 3 | P/MA | Elevated |
| 4 | B/MA | Ambient |
| 5 | B/MVK | Elevated |

The copolymers are amorphous, terminally unsaturated, highly branched olefin-acrylate copolymers having a relatively narrow molecular weight distribution with the acrylate moiety present predominantly at the end of the branches.

Example 2

Amination of the product of Example 1 /Run 1 with a polyamine and a chain stopper (polyisobutenyl succinic anhydride).

200 gms of the modified polymer of Example 1 /Run 4 are placed in a suitable glass reactor equipped with adequate stirring. The reactor is purged with nitrogen for 30 minutes and the contents are heated to about 100° C. About 350 gms of polyisobutenyl succinic anhydride having an ASTM, D-64 Sap. No. 112 which are diluted with 350 gms of solvent 100N diluent oil are added to the polymer with stirring and the temperature is raised to about 190° C. The reaction mixture is held at that temperature with nitrogen stripping for 3 hours, followed by cooling. The resulting product is a viscous liquid substantially free of gel.

Example 3

The copolymer of Example 1/Run 4 is aminated with a polypropylene tetraamine with one end substituted with a tallow group with approximately one primary amine per molecule and a nitrogen content of 12.4%. The reagents are mixed at room temperature and heated to 200° C. for 7 hrs. while nitrogen stripping. The reaction mixture shows conversion to the corresponding amide. About 150 g of the amide is diluted in 99 g of S150N mineral oil and heated to 145° C. and 9.35 g of a 30% boric acid slurry in oil is added over one hour. After addition is complete, the temperature is raised to 150° C. and the reaction mixture is nitrogen stripped for one hour. The corresponding borated, aminated dispersant derivative is produced.

Example 4

The copolymer of Example 1/Run 4 is aminated with a polypropylene ether pentamine with only one end substituted with a dodecyl alkyl group with approximately one primary amine group per molecule and a nitrogen content of 12.92%. The reagents are mixed at room temperature and heated to 220° C. for 4 hrs. The product is stripped with nitrogen for 3 hrs. at 220° C. resulting in an amide derivative. About 1,540 g of the amide are diluted with 810 g of S150N and the oil solution borated at 145° C. with 105 g of a 30% boric acid slurry as previously described. A borated, aminated dispersant derivative is produced.

Example 5

The POH copolymer of Example 1/Run I is aminated with 2-ethylhexylaminopropylaminopropylaminopropylamine with approximately one primary amino group per molecule and a nitrogen content of 18.24% by heating to 200° C. The reaction mixture is vacuum heated (10–20 mm Hg) for several hours until the reaction shows conversion to the amide and the amide is nitrogen stripped. The product is diluted in mineral oil to make a 50% solution and borated using the process described in the preceding examples to yield a borated, aminated dispersant derivative.

Example 6

235 g of the POH copolymer of Example 1/Run 4 is heated to 180° C. and 23 g of dimethylaminopropylaminopropylamine (DMAPAPA) having approximately one primary amine group per molecule and a nitrogen content of 25.4% is added. The reaction mixture is heated at 180° C. for several hours to convert the copolymer to the corresponding amide and the product is nitrogen stripped at 180C for 4 hrs. to distill off the unreacted amine.

Example 7

Polymerization according to Example 1/Run 4 is carried out except that a continuous process is used with an olefinic feed obtained from a refinery Raffinate 2 source in combination with methyl acrylate polar comonomer and polymerization conditions are controlled to produce a polar olefinic hydrocarbon copolymer useful as a dispersant backbone, with a Mn of about 1,000.

Various aspects of the invention and their relationship to one another can be represented as follows:

Hydrocarbon copolymer derived from at least one polymerizable polar monomer and at least one polymerizable olefinic monomer, said copolymer suitable for use as a fuel or lubricant additive, said copolymer having the following characteristics:
(a) an average ethylene sequence length, ESL, of from about 1.0 to less than about 3.0;
(b) an average of at least 5 branches per 100 carbon atoms of the copolymer chains comprising said copolymer;
(c) at least about 50% of said branches being methyl and/or ethyl branches;
(d) substantially all of said incorporated polar monomer is present at the terminal position of said branches;
(e) at least about 30% of said copolymer chains terminated with a vinyl or vinylene group;
(f) a number average molecular weight, Mn, of from about 300 to about 10,000; and
(g) substantial solubility in hydrocarbon and/or synthetic base oil.

The copolymer of aspect 1 wherein said ESL is from about 1.0 to about 1.5.

The copolymer of aspect 2 having an average of from about 10 to about 12.5 branches per 100 carbon atoms of said copolymer chains.

The copolymer of aspect 3 wherein at least about 95% of said branches are methyl and/or ethyl branches.

The copolymer of aspect 4 wherein at least about 95% of said copolymer chains are terminated with a vinyl or vinylene group.

The copolymer of aspect 5 having a number average molecular weight, Mn, of from about 700 to about 2,500.

The copolymer of aspect 1 wherein the incorporated polar moiety derived from said polymerizable polar monomer which is incorporated in said copolymer is present at an average concentration of from about one polar moiety for each 5,000 Mn segment of polymer backbone, including branches, to about one polar moiety for each 1,000 Mn segment.

The copolymer of aspect 7 wherein said polar monomer is selected from the group consisting of methyl acrylate, ethyl acrylate, tert-butyl acrylate, methyl methacrylate, methyl ethacrylate, ethyl methacrylate, ethyl ethacrylate and methyl vinyl ketone.

The copolymer of aspect 8 wherein said olefinic monomer is selected from the group consisting of ethylene, propylene and butene-1.

A composition of matter suitable for use as a fuel or lubricant additive consisting essentially of hydrocarbon copolymer derived from at least one polymerizable polar monomer and at least one polymerizable olefinic monomer; said copolymer having at least two nitrogen atoms incorporated therein; said polar monomer selected from α, β unsaturated carbonyl compounds represented by the formula:

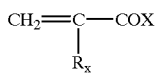

wherein X is hydrogen (H), $NH_2$, $R_y$ or $OR_y$; $R_x$ is H or a $C_1$–$C_5$ straight or branched alkyl group and $R_y$ is H or a $C_1$ to $C_{20}$ straight or branched alkyl group; for short chain unsaturated ester monomers, $R_y$ is preferably a $C_1$–$C_5$ alkyl group and for long chain monomers, preferably a $C_{10}$ to $C_{18}$ alkyl group; said olefinic monomer selected from the group consisting of ethylene, $C_3$–$C_{20}$ α-olefins and a mixture of $C_3$–$C_{20}$ α-olefins; said copolymer having the following characteristics:
(a) an average ethylene sequence length, ESL, of from about 1.0 to less than about 3.0;
(b) an average of at least 5 branches per 100 carbon atoms of the copolymer chains comprising said copolymer;
(c) at least about 50% of said branches being methyl and/or ethyl branches;
(d) substantially all of said incorporated polar monomer is present at the terminal position of said branches;
(e) at least about 30% of said copolymer chains terminated with a vinyl or vinylene group;
(f) a number average molecular weight, Mn, of from about 300 to about 10,000; and
(g) substantial solubility in hydrocarbon and/or synthetic base oil.

The composition of matter of aspect 10 wherein the incorporated polar moiety derived from said polymerizable polar monomer which is incorporated in said copolymer is present at an average concentration of from about one polar moiety for each 5,000 Mn segment of polymer backbone, including branches, to about one polar moiety for each 1,000 Mn segment.

The composition of matter of aspect 11 wherein said polar monomer is selected from the group consisting of methyl acrylate, ethyl acrylate, tert-butyl acrylate, methyl methacrylate, methyl ethacrylate, ethyl methacrylate, ethyl ethacrylate, methyl vinyl ketone and acrylamide.

The composition of matter of aspect 12 wherein said olefinic monomer is selected from the group consisting of ethylene, propylene and butene-1.

The composition of matter of aspect 10 wherein said mixture of $C_3$–$C_{20}$ α-olefins is selected from the group consisting of $C_3$, $C_4$, and $C_5$ refinery or steam cracker feedstreams and raffinate derivatives thereof.

The composition according to aspect 10 wherein said polymerizable olefinic monomer is ethylene, said branches in said copolymer, element (b), are present at an average of from about 5 to about 33 branches per 100 carbon atoms and said terminal groups of (d) are vinyl and said polar monomer is an alkyl acrylate.

A process for continuously producing hydrocarbon copolymer derived from at least one polymerizable polar monomer and at least one polymerizable olefinic monomer; said copolymer suitable for use as a fuel or lubricant additive; said copolymer having the following characteristics:
(a) an average ethylene sequence length, ESL, of from about 1.0 to less than about 3.0;

(b) an average of at least 5 branches per 100 carbon atoms of the copolymer chains comprising said copolymer;
(c) at least about 50% of said branches being methyl and/or ethyl branches;
(d) substantially all of said incorporated polar monomer is present at the terminal position of said branches;
(e) at least about 30% of said copolymer chains terminated with a vinyl or vinylene group;
(f) a number average molecular weight, Mn, of from about 300 to about 10,000; and
(g) substantial solubility in hydrocarbon and/or synthetic base oil;

said copolymer derived from at least one polymerizable polar monomer selected from $\alpha$, $\beta$ unsaturated carbonyl compounds represented by the formula:

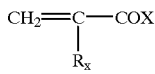

wherein X is hydrogen (H), $NH_2$, $R_y$ or $OR_y$; $R_x$ is H or a $C_1$–$C_5$ straight or branched alkyl group and $R_y$ is H or a $C_1$ to $C_{20}$ straight or branched alkyl group; for short chain unsaturated ester monomers, $R_y$ is preferably a $C_1$–$C_5$ alkyl group and for long chain monomers, preferably a $C_{10}$ to $C_{18}$ alkyl group; and at least one polymerizable olefinic monomer selected from the group consisting of ethylene, $C_3$–$C_{20}$ $\alpha$-olefins and a mixture of $C_3$–$C_{20}$ $\alpha$-olefins; said monomers polymerized in the presence of a late-transition-metal catalyst system in a reaction zone containing liquid phase, said process further comprising:

(A) feeding to said reaction zone a feedstream comprising said polar monomer, either alone or in the presence of said olefinic monomer;
(B) when at least one $\alpha$-olefin monomer is selected, continuously providing said $\alpha$-olefin as a dilute, liquefied $\alpha$-olefin feed stream from a refinery or steam cracker, said feed stream containing diluent admixed therewith wherein the amount of diluent in said feed stream is at least 30 weight percent thereof;
(C) when ethylene is selected, continuously providing a feed stream comprising ethylene in liquid, vapor, or liquid/vapor form;
(D) when a mixture of ethylene and an $\alpha$-olefin is selected, admixing the feed streams of steps (B) and (C) to provide a reactant feed stream having an $\alpha$-olefin/ethylene weight ratio effective to yield a copolymer containing an average ethylene sequence length, ESL, of from about 1.0 to less than about 3.0;
(E) continuously introducing said feed streams derived in accordance with steps (A), (B), (C) or (D) and late-transition-metal catalyst system into the liquid phase of the reaction zone in a manner and under conditions sufficient to:
  (i) polymerize the ethylene and/or $\alpha$-olefin to copolymer product having a number average molecular weight of not greater than 10,000;
  (ii) obtain an $\alpha$-olefin conversion, when an $\alpha$-olefin is used as a monomer, of at least 30%;
  (iii) obtain an ethylene conversion, where ethylene is used as a monomer, of at least 70%
(F) continuously withdrawing said copolymer from the reactor.

The process of aspect 16 wherein said olefinic monomer is selected from olefin-containing refinery or steam cracker feedstreams.

The process of aspect 17 wherein said feedstream is selected from the group consisting of Raffinate-2, and $C_3$, $C_4$ or $C_5$ sources and mixtures thereof.

The process of aspect 16 wherein at least 50 weight % of the constituents of said diluent possess a boiling point under reaction conditions within ±20° C. of the average boiling point of the $\alpha$-olefin constituents of the feed stream.

The process of aspect 16 or aspect 19 wherein the contents of the reaction zone are maintained at a temperature above the critical temperature of ethylene and below the critical temperature of said $\alpha$-olefin, as appropriate, when ethylene and/or at least one $\alpha$-olefin is present.

The process of any of aspects 16 to 20 wherein said $\alpha$-olefin monomer comprises at least one monomer selected from the group consisting of butene-1, propylene, and pentene-1 and said diluent comprises substantially nonpolymerizable $C_3$, $C_4$, $C_5$ hydrocarbons and mixtures thereof, other than said $\alpha$-olefin monomer.

The process of any of aspects 16 to 21 wherein the polymerization reaction temperature is controlled by evaporative cooling means.

The process of aspect 22 wherein in step (E) continuously the vapor above the liquid phase is at least partially condensed and the condensate is returned to said liquid phase.

The process of aspect 16 wherein said dilute liquefied $\alpha$-olefin feed stream is derived from a refinery or steam cracker stream comprising at least one $\alpha$-olefin from which dienes, but not polar compounds, are substantially removed prior to introduction of said feed stream into said reactor.

A dispersant comprising a functionalized hydrocarbon copolymer derived from the copolymer of aspects 1 or 10 by reacting said copolymer with a polyamine having one primary amino group and 1 to 10 secondary or tertiary amino groups.

The dispersant of aspect 25 wherein said copolymer from which it is derived initially contains an average of from about 1 to about 6 polar groups per copolymer chain.

The gel-free composition of aspect 25 wherein the reaction to produce said derivatized copolymer is conducted in the presence of a chain-stopping or end-capping co-reactant.

The composition of aspect 27 wherein said chain-stopping or end-capping co-reactant comprises $C_{12}$–$C_{400}$ hydrocarbyl substituted succinic acid or anhydride; long chain monocarboxylic acid of the formula $R_aCOOH$ wherein $R_a$ is $C_{12}$–$C_{400}$ hydrocarbyl; an amine containing only a single reactive amino group per molecule; an alcohol having only a single reactive hydroxy group per molecule; or mixtures thereof.

The composition of aspect 28 wherein said copolymer from which it is derived initially contains an average of from about 1 to about 2 polar groups per copolymer chain.

The reaction product of the copolymer of aspect 1 with an enophile.

The product of aspect 30 wherein said enophile is maleic anhydride.

The reaction product of aspect 31 further reacted with a member selected from the group consisting of amines and alcohols.

The reaction product of aspect 30 wherein said reaction is initiated using one or more free radical generating compound and wherein said reaction product contains an average of at least 2 of said copolymer chains linked to said enophile.

The reaction product of aspect 33 further reacted with polyamine and monofunctional chain stopping agent.

The functionalized copolymer of aspect 1, wherein the copolymer is further functionalized with at least one member selected from the group consisting of $C_3$ to $C_{10}$ mono-unsaturated monocarboxylic acid producing moieties and $C_4$ to $C_{10}$ mono-unsaturated dicarboxylic acid producing moieties.

A functionalized copolymer comprising an oxidized copolymer, wherein said oxidized copolymer is the reaction product of the copolymer of aspect 1 or aspect 6 and a gas selected from the group consisting of an oxygen-containing gas, an ozone-containing gas and mixtures thereof.

A derivatized copolymer useful as a lubricating oil dispersant additive, which comprises the reaction product of the functionalized copolymer of any of aspects 30 to 36 and a derivatizing compound.

The derivatized copolymer of aspect 37 in which the functionalized copolymer is reacted with at least one nucleophilic reagent selected from amines, alcohols, metal reactants, and mixtures thereof.

The reaction product of aspect 30 in which the functionalized copolymer is further reacted with a heavy polyamine.

A derivatized copolymer comprising the reaction product of:
(a) at least one alkyl-substituted hydroxyaromatic compound formed by the alkylation of at least one hydroxy aromatic compound with the copolymer as in aspect 1;
(b) at least one aldehyde reactant; and
(c) at least one nucleophilic reactant.

The reaction product of the copolymer of aspect 1 further reacted with a phenol in the presence of an acid catalyst.

The reaction product of aspect 41 further reacted with a member selected from the group consisting of aldehyde and polyamine.

The reaction product of aspect 42 in which said polyamine is a heavy polyamine.

A lubricating oil composition comprising a major amount of basestock lubricating oil of lubricating viscosity, and an effective amount of a viscosity modifier comprising hydrocarbon copolymer derived from at least one polymerizable polar monomer and at least one polymerizable olefinic monomer, said copolymer suitable for use as a fuel or lubricant additive, said copolymer having the following characteristics:
(a) an average ethylene sequence length, ESL, of from about 1.0 to less than about 3.0;
(b) an average of at least 5 branches per 100 carbon atoms of the copolymer chains comprising said copolymer;
(c) at least about 50% of said branches being methyl and/or ethyl branches;
(d) substantially all of said incorporated polar monomer is present at the terminal position of said branches;
(e) at least about 30% of said copolymer chains terminated with a vinyl or vinylene group;
(f) a number average molecular weight, Mn, of from about 15,000 to about 500,000; and (g) substantial solubility in hydrocarbon and/or synthetic base oil.

A lubricating oil composition comprising a major amount of a lubricating base oil, lubricating oil flow improver, and a minor amount of oil soluble copolymer as in aspect 44.

The lubricating oil composition of aspect 45, containing from 0.01 to 5 weight percent of said lubricating oil flow improver and from 0.1 to 20 weight percent of the said copolymer, based on the total weight of the composition.

An oil additive concentrate composition comprising hydrocarbon mineral oil diluent and about 2 to 50 wt. % based on the total amount of hydrocarbon mineral oil diluent of hydrocarbon copolymer derived from at least one polymerizable polar monomer and at least one polymerizable olefinic monomer, said copolymer suitable for use as a fuel or lubricant additive, said copolymer having the following characteristics:
(a) an average ethylene sequence length, ESL, of from about 1.0 to less than about 3.0;
(b) an average of at least 5 branches per 100 carbon atoms of the copolymer chains comprising said copolymer;
(c) at least about 50% of said branches being methyl and/or ethyl branches;
(d) substantially all of said incorporated polar monomer is present at the terminal position of said branches;
(e) at least about 30% of said copolymer chains terminated with a vinyl or vinylene group; and
(f) substantial solubility in hydrocarbon and/or synthetic base oil.

The oil additive concentrate according to aspect 47, wherein said copolymer has a number average molecular weight, Mn, of from about 300 to about 10,000.

The oil additive concentrate according to aspect 47, wherein said copolymer has a number average molecular weight of from about 11,000 to about 500,000.

An oil additive concentrate composition comprising hydrocarbon mineral oil diluent and about 2 to 50 wt. % based on the total amount of hydrocarbon mineral oil diluent of a derivatized copolymer useful as a lubricating oil dispersant additive, which derivatized copolymer comprises the reaction product of the functionalized copolymer of any of aspects 30 to 36.

A lubricating oil composition comprising base oil and, as a dispersant additive, a functionalized or derivatized copolymer as in any of
(a) a concentrate containing from 11 to 80 weight percent of said dispersant additive; or
(b) a composition containing from 0.1 to 10 weight percent of said dispersant additive.

A fuel oil composition comprising base oil and, as a dispersant additive, a functionalized or derivatized copolymer as in any of aspects 30 to 40, in the form of either:
(a) a concentrate containing from 11 to 80 weight percent of said dispersant additive; or
(b) a composition containing from 0.001 to 0.1 weight percent of said dispersant additive.

A process for continuously producing hydrocarbon copolymer suitable for use as a fuel or lubricant additive, said copolymer derived from at least one polymerizable polar monomer selected from α, β unsaturated carbonyl compounds represented by the formula:

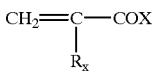

wherein X is hydrogen (H), $NH_2$, $R_y$ or $OR_y$; $R_x$ is H or a $C_1$–$C_5$ straight or branched alkyl group and $R_y$ is H or a $C_1$ to $C_{20}$ straight or branched alkyl group; for short chain unsaturated ester monomers, $R_y$ is preferably a $C_1$–$C_5$ alkyl group and for long chain monomers, preferably a $C_{10}$ to $C_{18}$ alkyl group; and at least one polymerizable olefinic monomer selected from the group consisting of ethylene, $C_3$–$C_{20}$ α-olefins and a mixture of $C_3$–$C_{20}$ α-olefins and polymerized in the presence of a late-transition-metal catalyst system in a reaction zone containing liquid phase, said process further comprising:

(A) when at least one α-olefin monomer is selected, continuously providing said α-olefin as a dilute, liquefied α-olefin feed stream from a refinery or steam cracker, said feed stream comprising diluent admixed therewith wherein the amount of diluent in said feed stream is at least 30 weight percent thereof;

(B) when ethylene is selected, continuously providing a feed stream comprising ethylene in liquid, vapor, or liquid/vapor form;

(C) when a mixture of ethylene and an α-olefin is selected, admixing the feed streams of steps (A) and (B) to provide a reactant feed stream having an α-olefin/ethylene weight ratio effective to yield a copolymer containing an average ethylene sequence length, ESL, of from about 1.0 to less than about 3.0;

(D) continuously introducing said feed stream or said reactant feed stream derived in accordance with steps (A), (B) or (C) as well as a feed stream of said polar monomer, and a late-transition-metal catalyst system into the liquid phase of the reaction zone in a manner and under conditions sufficient to:
(i) polymerize the ethylene and/or α-olefin to copolymer product having a number average molecular weight suitable for use as a fuel or lubricant additive;
(ii) obtain an α-olefin conversion, when an α-olefin is used as a monomer, of at least 30%;
(iii) obtain an ethylene conversion, where ethylene is used as a monomer, of at least 70%

(E) continuously withdrawing said copolymer from the reactor.

We claim:

1. Hydrocarbon copolymer derived from at least one polymerizable polar monomer and at least one polymerizable olefinic monomer, said polar monomer selected from α, β unsaturated carbonyl compounds represented by the formula:

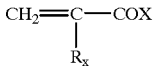

wherein X is hydrogen (H), $NH_2$, $R_y$ or $OR_y$; $R_x$ is H or a $C_1$–$C_5$ straight or branched alkyl group and $R_y$ is H or a $C_1$ to $C_{20}$ straight or branched alkyl group; said copolymer suitable for use as a fuel or lubricant additive, said copolymer having the following characteristics:

(a) an average ethylene sequence length, ESL, of from about 1.0 to less than about 3.0;

(b) an average of at least 5 branches per 100 carbon atoms of tilde copolymer chains comprising said copolymer;

(c) at least about 50% of said branches being methyl and/or ethyl branches;

(d) substantially all of said incorporated polar monomer is present at the terminal position of said branches;

(e) at least about 30% of said copolymer chains terminated with a vinyl or vinylene group;

(f) a number average molecular weight, Mn, of from about 300 to about 10,000; and (g) substantial solubility in hydrocarbon and/or synthetic base oil.

2. The copolymer of claim 1 wherein the incorporated polar moiety derived from said polymerizable polar monomer which is incorporated in said copolymer is present at an average concentration of from about one polar moiety for each 5,000 Mn segment of polymer backbone, including branches, to about one polar moiety for each 1,000 Mn segment.

3. The copolymer of claim 2 wherein said polar monomer is selected from the group consisting of methyl acrylate, ethyl acrylate, tert-butyl acrylate, methyl methacrylate, methyl ethacrylate, ethyl methacrylate, ethyl ethacrylate, methyl vinyl ketone and acrylamide.

4. The copolymer of claim 3 wherein said olefinic monomer is selected from the group consisting of ethylene, propylene and butene-1.

5. A composition of matter suitable for use as a fuel or lubricant additive consisting essentially of hydrocarbon copolymer derived from at least one polymerizable polar monomer and at least one polymerizable olefinic monomer; said copolymer having at least two nitrogen atoms incorporated therein; said polar monomer selected from α, β unsaturated carbonyl compounds represented by the formula:

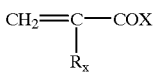

wherein X is hydrogen (H), $NH_2$, $R_y$ or $OR_y$; $R_x$ is H or a $C_1$–$C_5$ straight or branched alkyl group and $R_y$ is H or a $C_1$ to $C_{20}$ straight or branched alkyl group; said olefinic monomer selected from the group consisting of ethylene, $C_3$–$C_{20}$ α-olefins and a mixture of $C_3$–$C_{20}$ α-olefins; said copolymer having the following characteristics:

(a) an average ethylene sequence length, ESL, of from about 1.0 to less than about 3.0;

(b) an average of at least 5 branches per 100 carbon atoms of the copolymer chains comprising said copolymer;

(c) at least about 50% of said branches being methyl and/or ethyl branches;

(d) substantially all of said incorporated polar monomer is present at the terminal position of said branches;

(e) at least about 30% of said copolymer chains terminated with a vinyl or vinylene group;

(f) a number average molecular weight, Mn, of from about 300 to about 10,000; and (g) substantial solubility in hydrocarbon and/or synthetic base oil.

6. The composition of matter of claim 5 wherein the incorporated polar moiety derived from said polymerizable polar monomer which is incorporated in said copolymer is present at an average concentration of from about one polar moiety for each 5,000 Mn segment of polymer backbone, including branches, to about one polar moiety for each 1,000 Mn segment.

7. The composition of matter of claim 6 wherein said polar monomer is selected from the group consisting of methyl acrylate, ethyl acrylate, tert-butyl acrylate, methyl methacrylate, methyl ethacrylate, ethyl methacrylate, ethyl ethacrylate, methyl vinyl ketone, and acrylamide.

8. The composition of matter of claim 7 wherein said olefinic monomer is selected from the group consisting of ethylene, propylene and butene-1.

9. A process for continuously producing hydrocarbon copolymer derived from at least one polymerizable polar monomer and at least one polymerizable olefinic monomer; said copolymer suitable for use as a fuel or lubricant additive; said copolymer having the following characteristics:

(a) an average ethylene sequence length, ESL, of from about 1.0 to less than about 3.0;

(b) an average of at least 5 branches per 100 carbon atoms of the copolymer chains comprising said copolymer;

(c) at least about 50% of said branches being methyl and/or ethyl branches;

(d) substantially all of said incorporated polar monomer is present at the terminal position of said branches;

(e) at least about 30% of said copolymer chains terminated with a vinyl or vinylene group;

(f) a number average molecular weight, Mn, of from about 30C0 to about 10,000; and (g) substantial solubility in hydrocarbon and/or synthetic base oil: said copolymer derived from at least one polymerizable polar monomer selected, from a, 0 unsaturated carbonyl compounds represented by the formula:

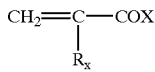

wherein X is hydrogen (H), $NH_2$, $R_y$ or $OR_y$; $R_x$ is H or a $C_1$–$C_5$ straight or branched alkyl group and $R_y$ is H or a $C_1$ to $C_{20}$ straight or branched alkyl group; and at least one polymerizable olefinic monomer selected from the group consisting of ethylene, $C_3$–$C_{20}$ α-olefins and a mixture of $C_3$–$C_{20}$ α-olefins; said monomers polymerized in the presence of a late-transition-metal catalyst system in a reaction zone containing liquid phase, said process further comprising:

(A) feeding to said reaction zone a feedstream comprising said polar monomer, either alone or in the presence of said olefinic monomer;

(B) when at least one α-olefin monomer is selected, continuously providing said α-olefin as a dilute, liquefied α-olefin feed stream from a refinery or steam cracker, said feed stream containing diluent admixed therewith wherein the amount of diluent in said feed stream is at least 30 weight percent thereof;

(C) when ethylene is selected, continuously providing a feed stream comprising ethylene in liquid, vapor, or liquid/vapor form;

(D) when a mixture of ethylene and an α-olefin is selected, admixing the feed streams of steps (B) and (C) to provide a reactant feed stream having an α-olefin/ethylene weight ratio effective to yield a copolymer containing an average ethylene sequence length, ESL, of from about 1.0 to less than about 3.0;

(E) continuously introducing said feed streams derived in accordance with steps (A), (B), (C) or (D) and late-transition-metal catalyst system into the liquid phase of the reaction zone in a manner and under conditions sufficient to:

(i) polymerize the ethylene and/or α-olefin to copolymer product having a number average molecular weight of not greater than 10,000;

(ii) obtain an α-olefin conversion, when an α-olefin is used as a monomer, of at least 30%;

(iii) obtain an ethylene conversion, where ethylene is used as a monomer, of at least 70%

(F) continuously withdrawing said copolymer from the reactor.

10. The process of claim 9 wherein said olefinic monomer is selected from olefin-containing refinery or steam cracker feedstreams.

11. The process of claim 10 wherein said feedstream is selected from the group consisting of Raffinate-2, and $C_3$, $C_4$ or $C_5$ sources and mixtures thereof.

12. A dispersant comprising a functionalized hydrocarbon copolymer derived from the copolymer of claims 1 or 5 by reacting said copolymer with a polyamine having one primary amino group and 1 to 10 secondary or tertiary amino groups.

13. The dispersant of claim 12 wherein said copolymer from which it is derived initially contains an average of from about 1 to about 6 polar groups per copolymer chain.

14. The gel-free composition of claim 12 wherein the reaction to produce said derivatized copolymer is conducted in the presence of a chain-stopping or end-capping co-reactant.

15. The composition of claim 14 wherein said chain-stopping or end-capping co-reactant comprises $C_{12}$–$C_{400}$ hydrocarbyl substituted succinic acid or anhydride; long chain monocarboxylic acid of the formula $R_aCOOH$ wherein $R_a$ is $C_{12}$–$C_{400}$ hydrocarbyl; an amine containing only a single reactive amino group per molecule; an alcohol having only a single reactive hydroxy group per molecule; or mixtures thereof.

16. The composition of claim 15 wherein said copolymer from which it is derived initially contains an average of from about 1 to about 2 polar groups per copolymer chain.

17. A derivatized copolymer useful as a lubricating oil dispersant additive, which comprises the reaction product of the functionalized copolymer of claim 12 and a derivatizing compound.

18. A lubricating oil composition comprising a major amount of basestock lubricating oil of lubricating viscosity, and an effective amount of a viscosity modifier comprising the hydrocarbon copolymer of claim 1.

19. A lubricating oil composition comprising a major amount of a lubricating base oil, lubricating oil flow improver, and a minor amount of the hydrocarbon copolymer of claim 1.

20. An oil additive concentrate composition comprising hydrocarbon mineral oil diluent and about 2 to 50 wt. % based on the total amount of hydrocarbon mineral oil diluent of the hydrocarbon copolymer of claim 1.

21. An oil additive concentrate composition comprising hydrocarbon mineral oil diluent and about 2 to 50 wt. % based on the total amount of hydrocarbon mineral oil diluent of the derivatized copolymer of claim 17.

22. A lubricating oil or fuel oil composition comprising base oil and, as a dispersant additive, a functionalized or derivatized copolymer as claimed in any of claims 12 or 17, in the form of either:

(a) a lubricating oil concentrate containing from 11 to 80 weight percent of said dispersant additive; or (b) a lubricating oil composition containing from 0.1 to 10 weight percent of said dispersant additive; or (c) a fuel oil concentrate containing from 11 to 80 weight percent of said dispersant additive; or (d) a fuel oil composition containing from 0.001 to 0.1 weight percent of said dispersant additive.

23. A process for continuously producing hydrocarbon copolymer suitable for use as a fuel or lubricant additive; said copolymer derived from at least one polymerizable polar monomer and at least one polymerizable olefinic monomer; said at least one polymerizable olefinic monomer selected from the group consisting of ethylene, $C_3$–$C_{20}$ α-olefins and a mixture of $C_3$–$C_{20}$ α-olefins; said monomers polymerized in the presence of a late-transition-metal catalyst system in a reaction zone containing liquid phase; said process further comprising:

(A) feeding to said reaction zone a feedstream comprising said polar monomer, either alone or in the presence of said olefinic monomer;

(B) when at least one α-olefin monomer is selected, continuously providing said α-olefin as a dilute, liquefied α-olefin feed stream from a refinery or steam cracker, said feed stream containing diluent admixed therewith wherein the amount of diluent in said feed stream is at least 30 weight percent thereof;

(C) when ethylene is selected, continuously providing a feed stream comprising ethylene in liquid, vapor, or liquid/vapor form;

(D) when a mixture of ethylene and an α-olefin is selected, admixing the feed streams of steps (B) and (C) to provide a reactant feed stream having an α-olefin/ethylene weight ratio effective to yield a copolymer containing an average ethylene sequence length, ESL, of from about 1.0 to less than about 3.0;

(E) continuously introducing said feed streams derived in accordance with steps (A), (B), (C) or (D) and late-transition-metal catalyst system into the liquid phase of the reaction zone in a manner and under conditions sufficient to:

(i) polymerize the ethylene and/or α-olefin to copolymer product having a number average molecular weight suitable for use as a fuel or lubricant additive;

(ii) obtain an α-olefin conversion, when an α-olefin is used as a monomer, of at least 30%;

(iii) obtain an ethylene conversion, where ethylene is used as a monomer, of at least 70%

(F) continuously withdrawing said copolymer from the reactor.

24. The composition of matter of claim 5 wherein $R_y$ is selected from the group consisting of a $C_1$–$C_5$ alkyl for short chain unsaturated ester monomers and a $C_{10}$ to $C_{18}$ alkyl for long chain monomers.

25. The process of claim 9 wherein $R_y$ is selected from the group consisting of a $C_1$–$C_5$ alkyl for short chain unsaturated ester monomers and a $C_{10}$ to $C_{18}$ alkyl for long chain monomers.

26. The copolymer of claim 1 wherein $R_y$ is selected from the group consisting of a $C_1$–$C_5$ alkyl for short chain unsaturated ester monomers and a $C_{10}$ to $C_{18}$ alkyl for long chain monomers.

* * * * *